(12) United States Patent
Xian et al.

(10) Patent No.: US 8,448,863 B2
(45) Date of Patent: May 28, 2013

(54) BAR CODE SYMBOL READING SYSTEM SUPPORTING VISUAL OR/AND AUDIBLE DISPLAY OF PRODUCT SCAN SPEED FOR THROUGHPUT OPTIMIZATION IN POINT OF SALE (POS) ENVIRONMENTS

(75) Inventors: Tao Xian, Columbus, NJ (US); Duane Ellis, Medford, NJ (US); Timothy Good, Clementon, NJ (US); Xiaoxun Zhu, Suzhou (CN)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 12/966,330

(22) Filed: Dec. 13, 2010

(65) Prior Publication Data

US 2012/0150589 A1    Jun. 14, 2012

(51) Int. Cl.
*G06K 7/10*    (2006.01)

(52) U.S. Cl.
USPC ...... 235/462.01; 235/435; 235/436; 235/454; 235/462.08; 235/462.22; 235/462.32; 235/462.41; 235/462.42; 235/462.43

(58) Field of Classification Search
USPC ............ 235/435, 436, 454, 462.08, 462.14, 235/462.22, 462.32, 462.41, 462.42, 462.43
See application file for complete search history.

(56) References Cited

U.S. PATENT DOCUMENTS

| | | | |
|---|---|---|---|
| 5,444,226 A * | 8/1995 | Collins, Jr. ............... | 235/462.01 |
| 6,439,462 B1 | 8/2002 | Dickson et al. | |
| 6,457,646 B1 | 10/2002 | Dickson et al. | |
| 6,494,377 B1 | 12/2002 | Lucera et al. | |
| 6,588,663 B1 | 7/2003 | Lucera et al. | |
| 7,066,391 B2 | 6/2006 | Tsikos et al. | |
| 7,077,319 B2 | 7/2006 | Schnee et al. | |
| 7,188,770 B2 | 3/2007 | Zhu et al. | |
| 7,501,616 B2 * | 3/2009 | Wiklof ....................... | 250/234 |
| 7,516,898 B2 | 4/2009 | Knowles et al. | |
| 7,520,433 B2 | 4/2009 | Knowles et al. | |
| 7,527,204 B2 | 5/2009 | Knowles et al. | |
| 7,533,820 B2 | 5/2009 | Knowles et al. | |
| 7,533,823 B2 | 5/2009 | Knowles et al. | |
| 7,537,165 B2 | 5/2009 | Knowles et al. | |
| 7,543,749 B2 | 6/2009 | Knowles et al. | |
| 7,546,952 B2 | 6/2009 | Knowles et al. | |
| 7,556,199 B2 | 7/2009 | Knowles et al. | |
| 7,559,474 B2 | 7/2009 | Knowles et al. | |
| 7,568,626 B2 | 8/2009 | Knowles et al. | |
| 7,571,858 B2 | 8/2009 | Knowles et al. | |
| 7,571,859 B2 | 8/2009 | Knowles et al. | |
| 7,575,169 B2 | 8/2009 | Knowles et al. | |
| 7,575,170 B2 | 8/2009 | Knowles et al. | |
| 7,578,445 B2 | 8/2009 | Knowles et al. | |

(Continued)

*Primary Examiner* — Allyson Trail
(74) *Attorney, Agent, or Firm* — Summa, Additon & Ashe, P.A.

(57) ABSTRACT

A POS-based bar code symbol reading system that reads bar code symbols on objects being passed through the 3D imaging or scanning volume supported by the system, and employs one or more object motion sensors (e.g. imaging based, IR Pulse-Doppler LIDAR-based, ultra-sonic energy based, etc.) to (i) measure or estimate the speed of objects being manually passed through the 3D imaging or scanning volume by the system operator, and (ii) visually and/or audibly display object scanning speed measures or estimates to provide the system operator with feedback for optimizing system throughput. The POS-based bar code symbol reading system has a performance advantage that leads to quicker customer checkout times and productivity gain that cannot be matched by the conventional bar code symbol scanning technology.

21 Claims, 21 Drawing Sheets

U.S. PATENT DOCUMENTS

| | | | |
|---|---|---|---|
| 7,581,680 B2 | 9/2009 | Knowles et al. | |
| 7,584,892 B2 | 9/2009 | Knowles et al. | |
| 7,588,188 B2 | 9/2009 | Knowles et al. | |
| 7,611,062 B2 | 11/2009 | Knowles et al. | |
| 7,614,560 B2 | 11/2009 | Knowles et al. | |
| 7,651,028 B2 | 1/2010 | Knowles et al. | |
| 7,658,330 B2 | 2/2010 | Knowles et al. | |
| 7,661,595 B2 | 2/2010 | Knowles et al. | |
| 7,661,597 B2 | 2/2010 | Knowles et al. | |
| 7,665,665 B2 | 2/2010 | Knowles et al. | |
| 7,668,406 B2 | 2/2010 | Schnee et al. | |
| 7,673,802 B2 | 3/2010 | Knowles et al. | |
| 7,731,091 B2 | 6/2010 | Knowles et al. | |
| 7,775,436 B2 | 8/2010 | Knowles et al. | |
| 7,784,698 B2 | 8/2010 | Knowles et al. | |
| 7,806,335 B2 | 10/2010 | Knowles et al. | |
| 7,878,407 B2 | 2/2011 | Knowles et al. | |
| 7,905,413 B2 | 3/2011 | Knowles et al. | |
| 7,954,719 B2 | 6/2011 | Zhu et al. | |
| 8,042,740 B2 | 10/2011 | Knowles et al. | |
| 2002/0178048 A1* | 11/2002 | Huffman | 705/11 |
| 2008/0249884 A1* | 10/2008 | Knowles et al. | 705/23 |

* cited by examiner

POS-Based Laser-Scanning Bar Code
Symbol Reading System

BAR CODE SYMBOL READING SYSTEM SUPPORTING VISUAL OR/AND AUDIBLE DISPLAY OF PRODUCT SCAN SPEED FOR THROUGHPUT OPTIMIZATION IN POINT OF SALE (POS) ENVIRONMENTS

BACKGROUND

1. Field

The present disclosure relates generally to improvements in methods of and apparatus for reading bar code symbols in point-of-sale (POS) environments in ways which support optimized cashier scanning and checkout operations and increased throughput performance.

2. Brief Description of the State of Knowledge in the Art

The use of bar code symbols for product and article identification is well known in the art. Presently, various types of bar code symbol scanners have been developed for reading bar code symbols at retail points of sale (POS).

In demanding retail environments, such as supermarkets and high-volume department stores, where high check-out throughput is critical to achieving store profitability and customer satisfaction, it is common to use laser scanning bar code reading systems having both bottom and side-scanning windows to enable highly aggressive scanner performance. In such systems, the cashier need only drag a bar coded product past these scanning windows for the bar code thereon to be automatically read with minimal assistance from the cashier or checkout personal. Such dual scanning window systems are typically referred to as "bioptical" laser scanning systems as such systems employ two sets of optics disposed behind the bottom and side-scanning windows thereof. Examples of polygon-based bioptical laser scanning systems are disclosed in U.S. Pat. Nos. 4,229,588; 4,652,732 and 6,814,292; each incorporated herein by reference in its entirety. Commercial examples of bioptical laser scanners include: the PSC 8500—6-sided laser based scanning by PSC Inc.; PSC 8100/8200, 5-sided laser based scanning by PSC Inc.; the NCR 7876—6-sided laser based scanning by NCR; the NCR7872, 5-sided laser based scanning by NCR; and the MS232x Stratos® H, and MS2122 Stratos® E Stratos 6 sided laser based scanning systems by Metrologic Instruments, Inc., and the MS2200 Stratos®S 5-sided laser based scanning system by Metrologic Instruments, Inc.

In recent years, high-performance digital imaging-based POS bar code symbol readers have been proposed for use in retail POS applications. Examples of such systems are disclosed in U.S. Pat. No. 7,540,424 B2 and U.S. Publication No. 2008-0283611 A1, both assigned to Metrologic Instruments, Inc.

However, despite the many improvements in both laser scanning and digital imaging based bar code symbol readers over the years, there is still a great need in the art for improved POS-based bar code symbol reading systems which are capable of supporting optimized cashier scanning and checkout operations, and increased throughput performance at POS stations, while avoiding the shortcomings and drawbacks of prior art systems and methodologies.

OBJECTS AND SUMMARY

Accordingly, a primary object of the present disclosure is to provide improved bar code symbol reading systems for use in POS environments, which are free of the shortcomings and drawbacks of prior art systems and methodologies.

Another object is to provide a POS-based bar code symbol reading system that is capable of visually and/or audibly displaying measures that are indicative of system performance (e.g. system throughput) which can be influenced by the system operator.

Another object is to provide such a POS-based bar code symbol reading system that employs illumination and digital imaging technologies to capture digital images of objects transported through the 3D imaging volume supported by the system.

Another object is to provide such a POS-based bar code symbol reading system that employs high-speed laser scanning technologies to capture scan data of laser-scanned objects transported through the 3D scanning volume supported by the system.

Another object is to provide such a POS-based bar code symbol reading system, wherein one or more object motion sensors (e.g. imaging based, IR Pulse-Doppler LIDAR-based, ultra-sonic energy based, etc.) are provided within the 3D scanning volume of the system, in various possible locations, for real-time measuring or estimating the speed of objects being manually moved through the 3D scanning volume by the cashier, so that measures indicative of system performance (e.g. system throughput) that can be influenced by the system operator, can be visually and/or audibly displayed to provided feedback to the cashier.

Another object is to provide a POS-based bar code reading system that supports a POS scanning optimization method addressing the needs of the supermarket/hypermarket and grocery store market segment.

Another object is to provide a POS-based bar code reading system having a performance advantage that leads to quicker customer checkout times and productivity gain.

Another object is to provide a high-performance bar code reading system that helps provide noticeable gains in worker productivity and checkout speed.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying figure Drawings in which.

Figure 1:
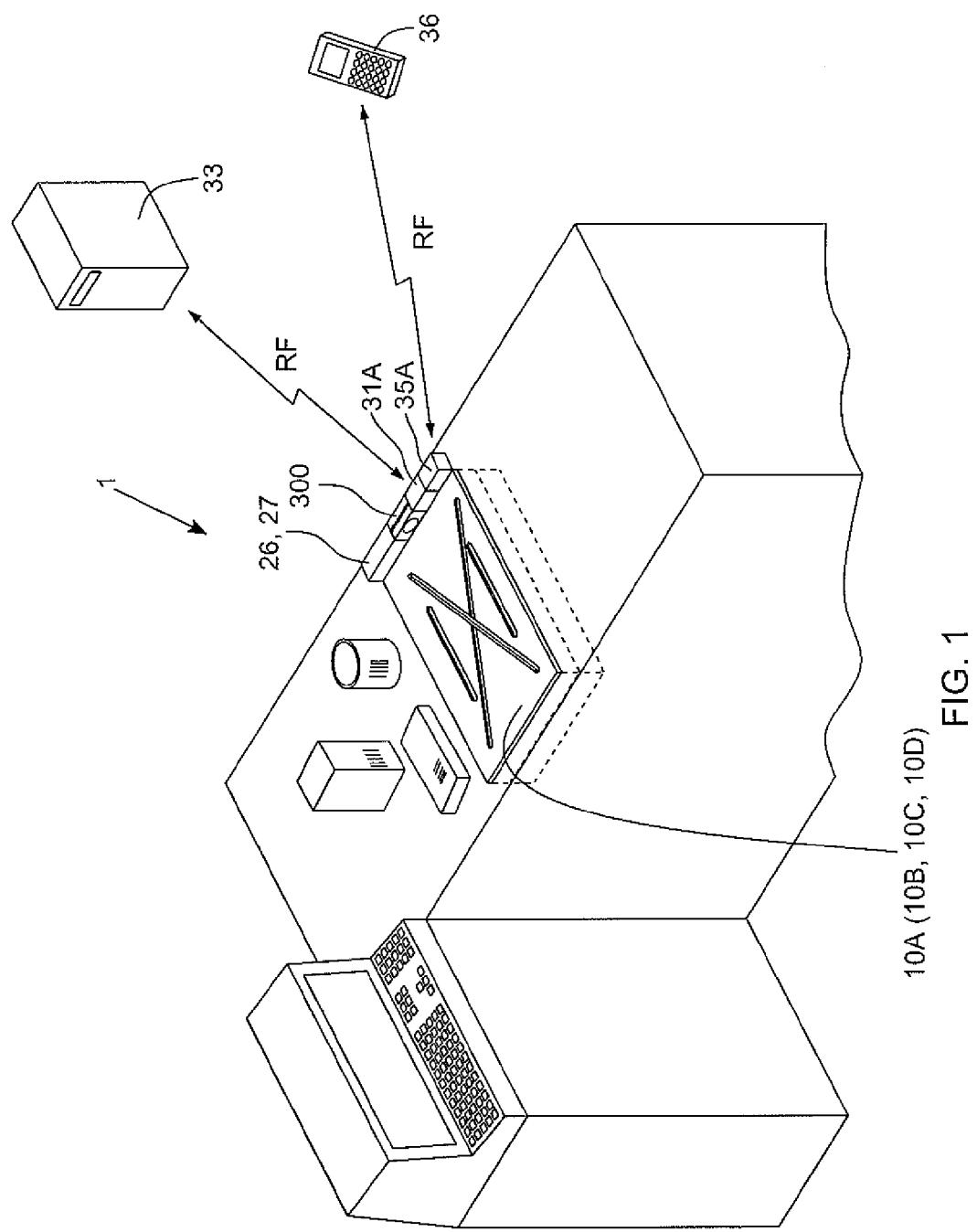
FIG. 1 is a perspective view of a retail point of sale (POS) station employing a first illustrative digital-imaging embodiment of the bar code symbol reading system, shown integrated with an electronic weight scale, an RFID reader and magnet-stripe card reader, and having thin, tablet-like form factor for compact mounting in the countertop surface of the POS station.
Figure 5A:
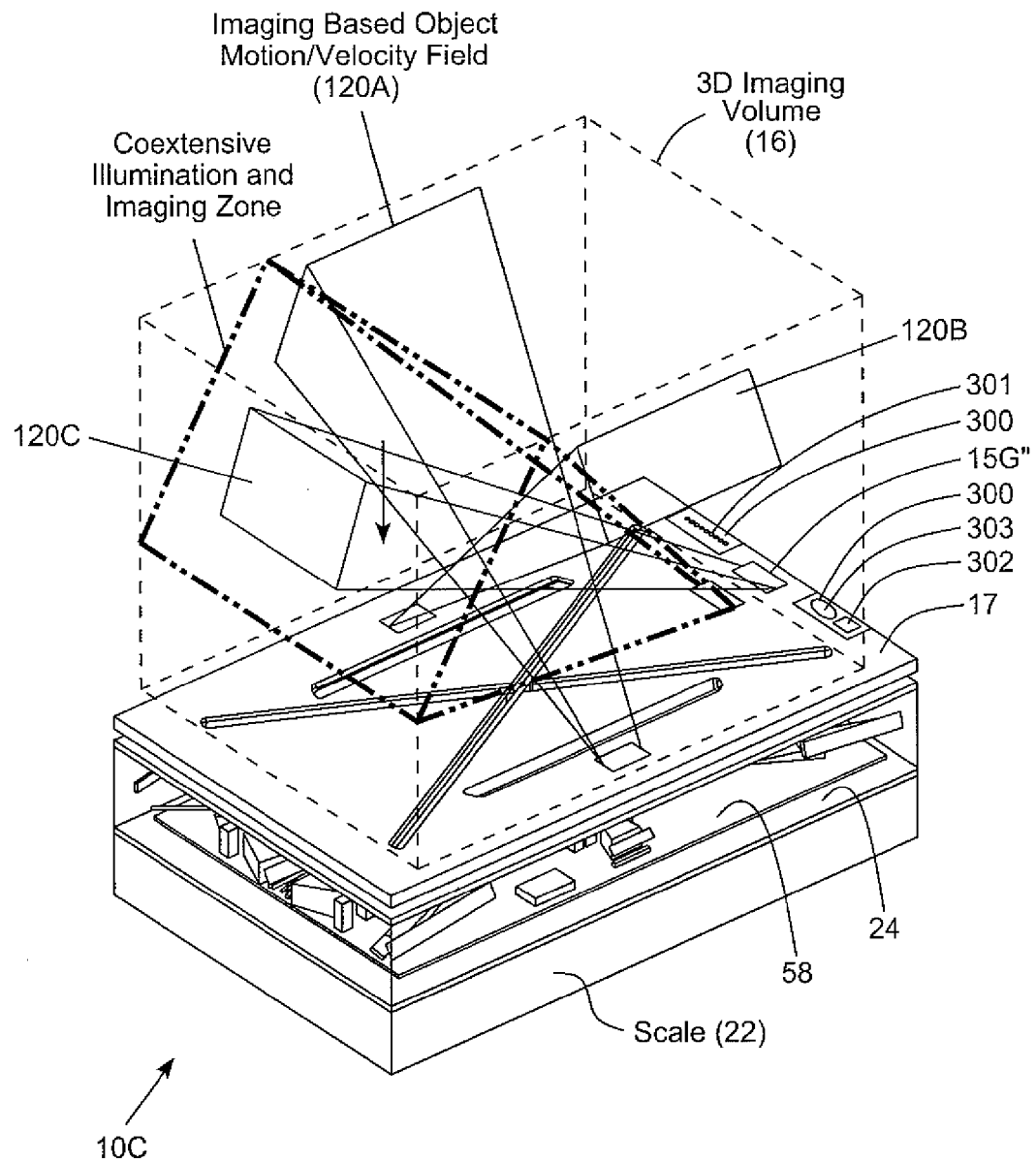
FIG. 5A is a perspective view of a third illustrative embodiment of the POS-based bar code symbol reading system, shown installed in the retail POS environment of FIG. 1, wherein each coplanar illumination and imaging subsystem employs (i) a linear array of VLDs or LEDs for generating a substantially planar illumination beam (PLIB) that is coplanar with the field of view of its linear (1D) image sensing array, and wherein a plurality of globally-controlled high-speed imaging-based motion/velocity subsystems are deployed across the system, for the purpose of (i) detecting whether or not an object is present within the FOV at any instant in time, and (ii) detecting the motion and velocity of objects passing through the FOV of the linear image sensing array, controlling camera parameters in real-time, including the clock frequency of the linear image sensing array, and (iii) automatically providing the system operator with visual and/or audio indication based feedback on the speed of objects transported through the 3D imaging volume.
Figure 5B:
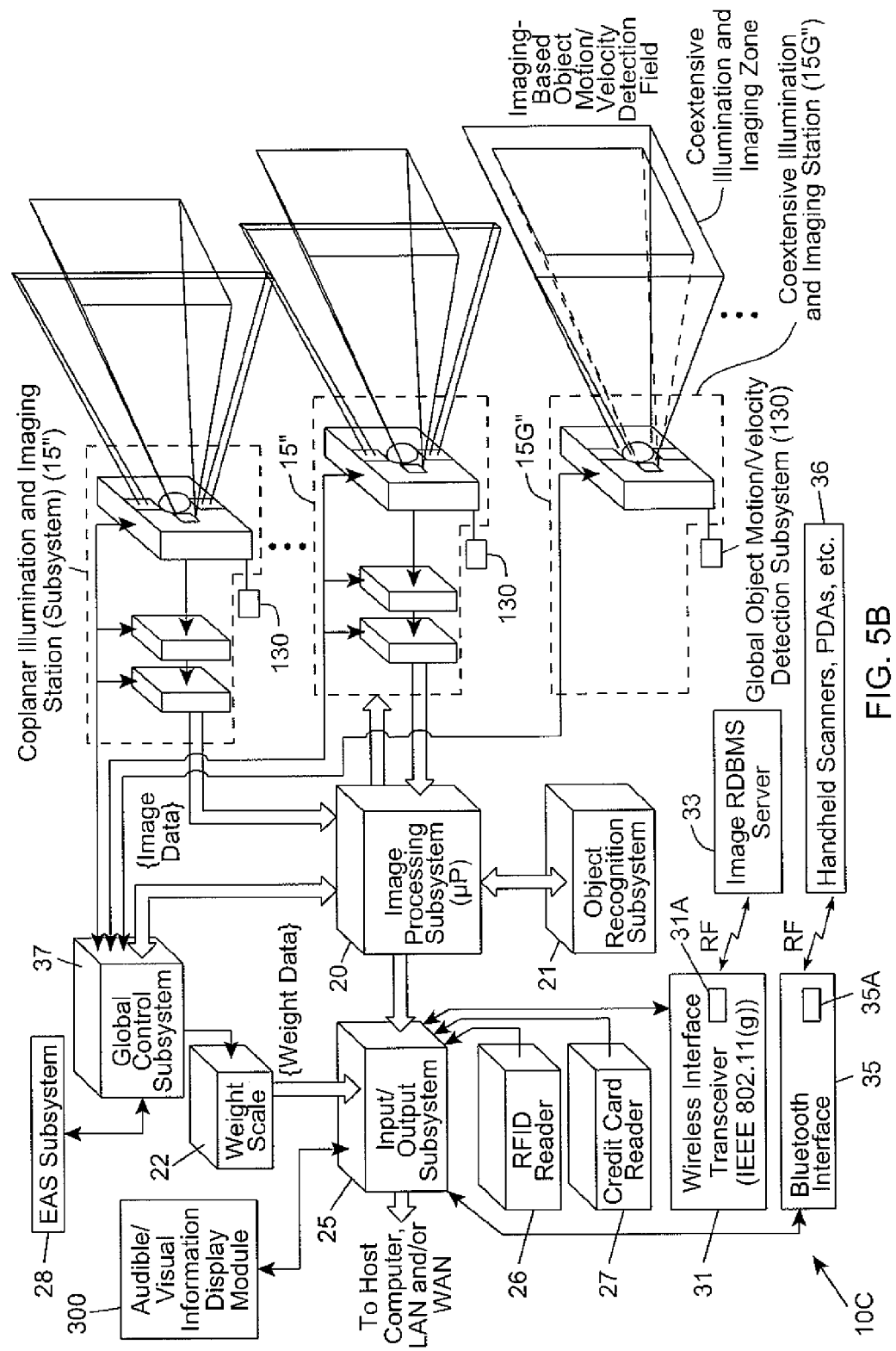
FIG. 5B is a block schematic representation of the system embodiment of FIG. 5A, wherein a complex of coplanar illuminating and linear imaging stations support (i) automatic image formation and capture along each coplanar illumination and imaging plane within the 3D imaging volume, (ii) imaging-based object motion/velocity sensing and intelligent automatic illumination control within the 3D imaging volume, and (iii) automatic display of object scanning speed/ velocity measures or estimates to provide the system operator with feedback in order to optimize scanning throughput.
Figure 5C:
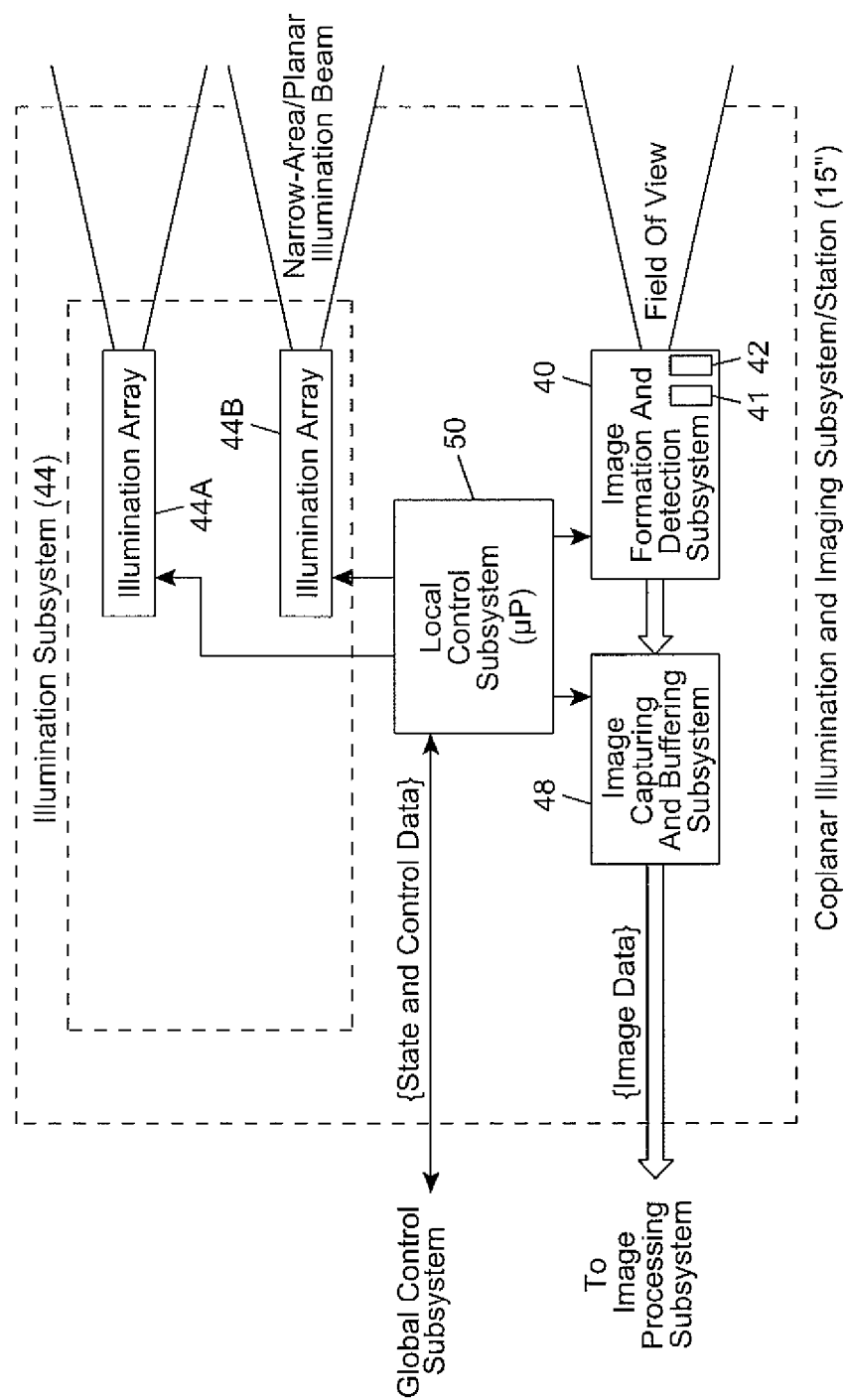
Figure 5D:
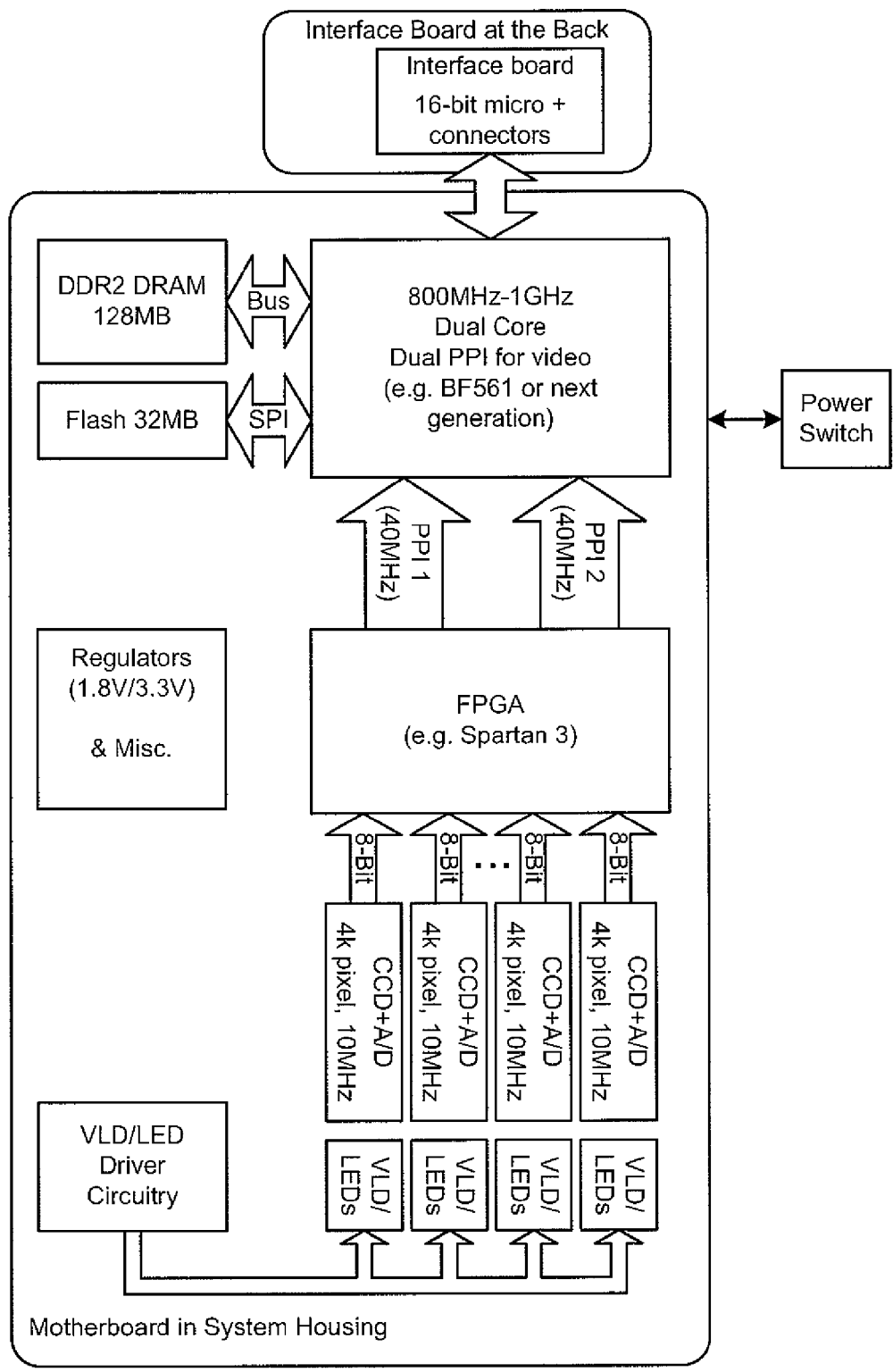
Figure 5E:
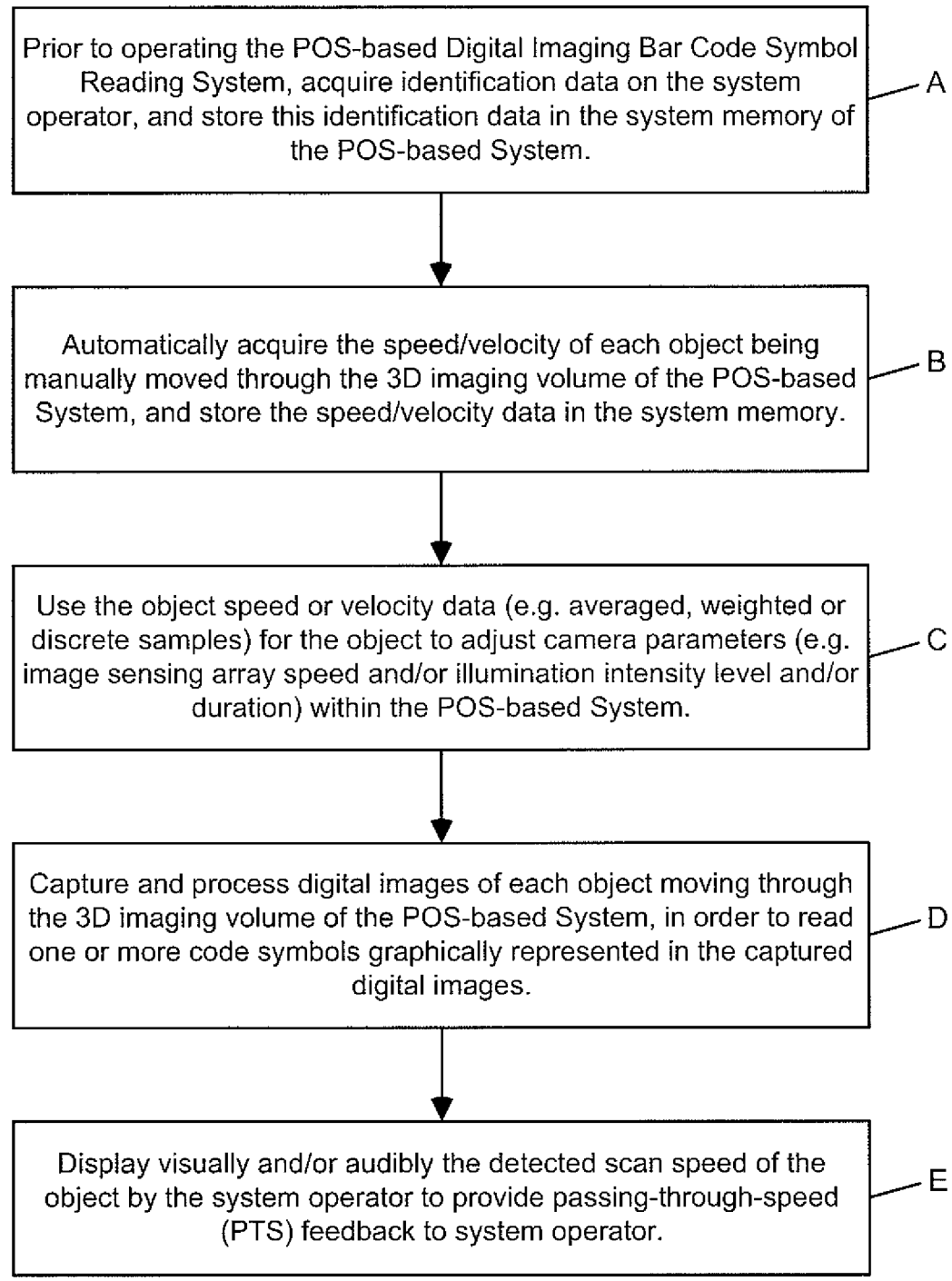
Figure 6A:
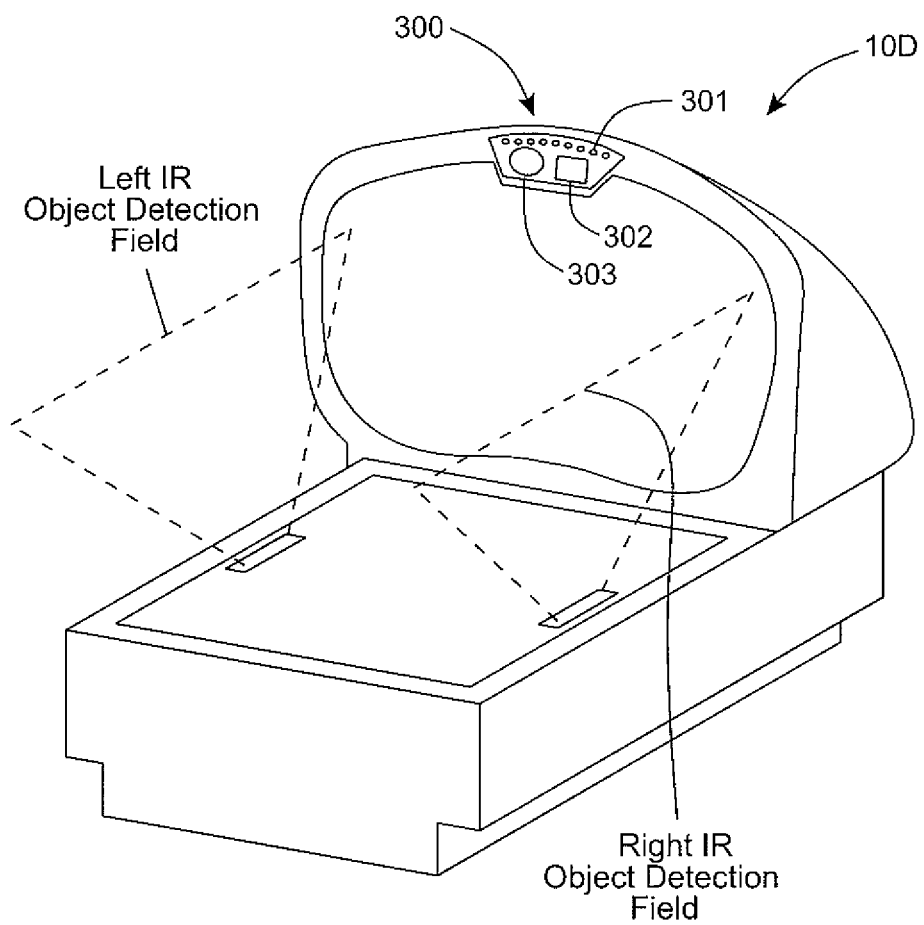
Figure 6B:
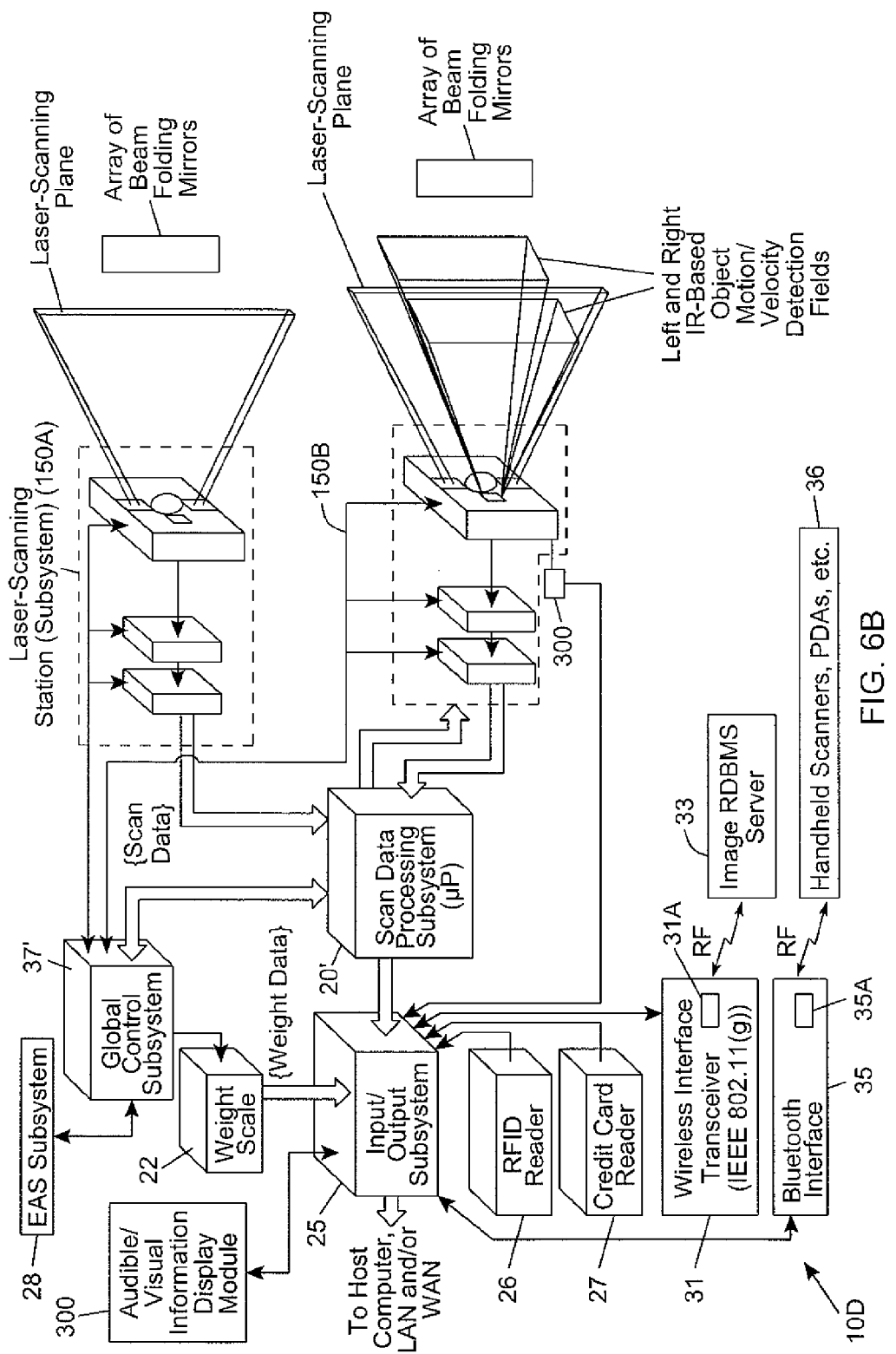
Figure 6C:
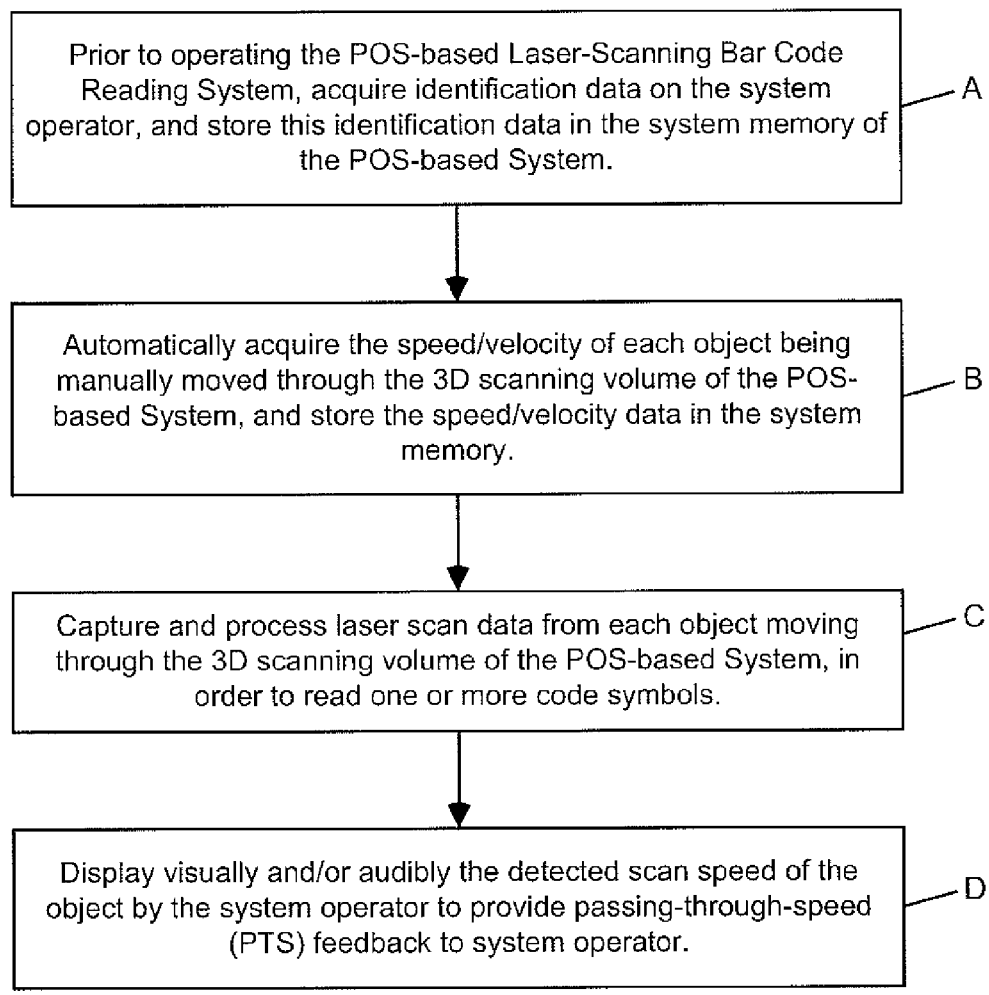

FIG. 5C is a block schematic representation of one of the coplanar illumination and imaging stations employed in the system embodiment of FIG. 5A, showing in greater detail its imaging-based object motion/velocity detection subsystem and how it cooperates with the local control subsystem, the planar illumination array (PLIA), and the linear image formation and detection subsystem;

FIG. 5D is a schematic diagram describing an exemplary embodiment of a computing and memory architecture platform for implementing the digital image capture and processing system described in FIGS. 5A, 5B and 5C;

FIG. 5E is a flow chart setting forth the major steps of the POS scanning optimization method supported by the digital-imaging based bar code symbol reading system shown in FIGS. 5A and 5B, involving the steps of (i) acquiring identification information on the system operator (i.e. cashier), (ii) automatically acquiring/capturing and storing the speed/velocity of each object being manually transported through the 3D imaging volume of the system, (iii) using the object speed/velocity data to adjust camera parameters (e.g. image sensing array speed, and/or illumination intensity level and/or duration) within the system, (iv) capturing and processing digital images of the object in order to read one or more code symbols graphically represented in the captured digital images, and (v) visually and/or audibly displaying the detected scan speed of objects by the system operator, to provide passing-through-speed (PTS) feedback to the system operator, and thereby optimizing scanner checkout speed and POS throughput;

FIG. 6A is a perspective view of a fourth illustrative embodiment of the POS-based bar code symbol reading system, shown installed in the retail POS environment of FIG. 1, wherein a pair of laser scanning subsystems are employed, and each being equipped with a laser scanning mechanism and array of beam forming mirrors for generating omni-directional laser scanning patterns that are projected through horizontal or vertical scanning windows of the system housing, and wherein a IR-based motion/velocity subsystem is deployed on opposite sides of the horizontal scanning window, for the purpose of (i) detecting whether or not an object is present within the FOV at any instant in time, and (ii) detecting the motion and velocity of objects passing through the FOV of the linear image sensing array, controlling camera parameters in real-time, including the clock frequency of the linear image sensing array, and (iii) automatically providing the system operator with visual and/or audio indication based feedback on the speed of objects transported through the 3D imaging volume;

FIG. 6B is a block schematic representation of the system embodiment of FIG. 6A, wherein its pair of laser scanning stations support (i) automatic laser scanning of bar code symbols along a complex of scanning planes passing through the 3D scanning volume of the system, (ii) IR-based object motion/velocity sensing of objects passing through the 3D scanning volume, and (iii) automatic display of object scanning speed/velocity measures or estimates to provide the system operator with feedback in order to optimize scanning throughput; and FIG. 6C is a flow chart setting forth the major steps of the POS scanning optimization method supported by the laser scanning based bar code symbol reading system shown in FIGS. 6A and 6B, involving the steps of (i) acquiring identification information on the system operator (i.e. cashier), (ii) automatically acquiring/capturing and stores the speed/velocity of each object being manually transported through the 3D scanning volume of the system, (iii) capturing and processing laser scan data signals collected from laser beam scanned objects in order to read one or more code symbols represented in the collected scan data signals, and (iv) visually and/or audibly displaying the detected scan speed of objects by the system operator, to provide visual and/or audible passing-through-speed (PTS) feedback to the system operator, and thereby optimizing scanner checkout speed and POS throughput.

DETAILED DESCRIPTION OF THE ILLUSTRATIVE EMBODIMENTS

Referring to the figures in the accompanying Drawings, the various illustrative embodiments of the apparatus and methodologies will be described in great detail, wherein like elements will be indicated using like reference numerals.

Digital-imaging and laser-scanning based bar code symbol reading systems are disclosed, employing real-time object scanning speed measurement and display feedback capabilities.

In particular, FIGS. 2 through 5E show several illustrative embodiments of digital-imaging based bar code symbol reading systems 10A, 10B, and 10C employing different techniques for real-time object scanning speed measurement through the imaging 3D imaging volume of the system. Also, FIGS. 6A through 6C show an illustrative embodiment of a laser-scanning based bar code symbol reading system 10D employing an illustrative technique for real-time object scanning speed measurement through the imaging 3D imaging volume of the system.

In general, each of these bar code symbol reading systems 10A through 10D can be installed in a point of sale (POS) environment (i.e. station) as shown in FIG. 1, having a countertop-surface in which, or on which the bar code symbol reading system 10A, (10B, 10C, 10D) can be installed and connected to a PC-based host system and/or information processing server 33, and other input/output devices, as shown and described in greater detail below.

In the illustrative embodiments, each bar code symbol reading system is equipped with object scanning speed display and feedback capabilities, supported at a retail point of sale (POS) station 1, as shown in FIG. 1.

In general, there are many different ways to measure, in real-time, the velocity or speed of objects (i.e. consumer products) being manually scanned through the 3D imaging volume of the system 10, for the purpose of displaying object scanning speed through the system, and providing "system throughput feedback" to the system operator and optimizing system throughput and cashier scanning performance.

Various techniques are illustrated throughout the figure drawings.

Figure 2:
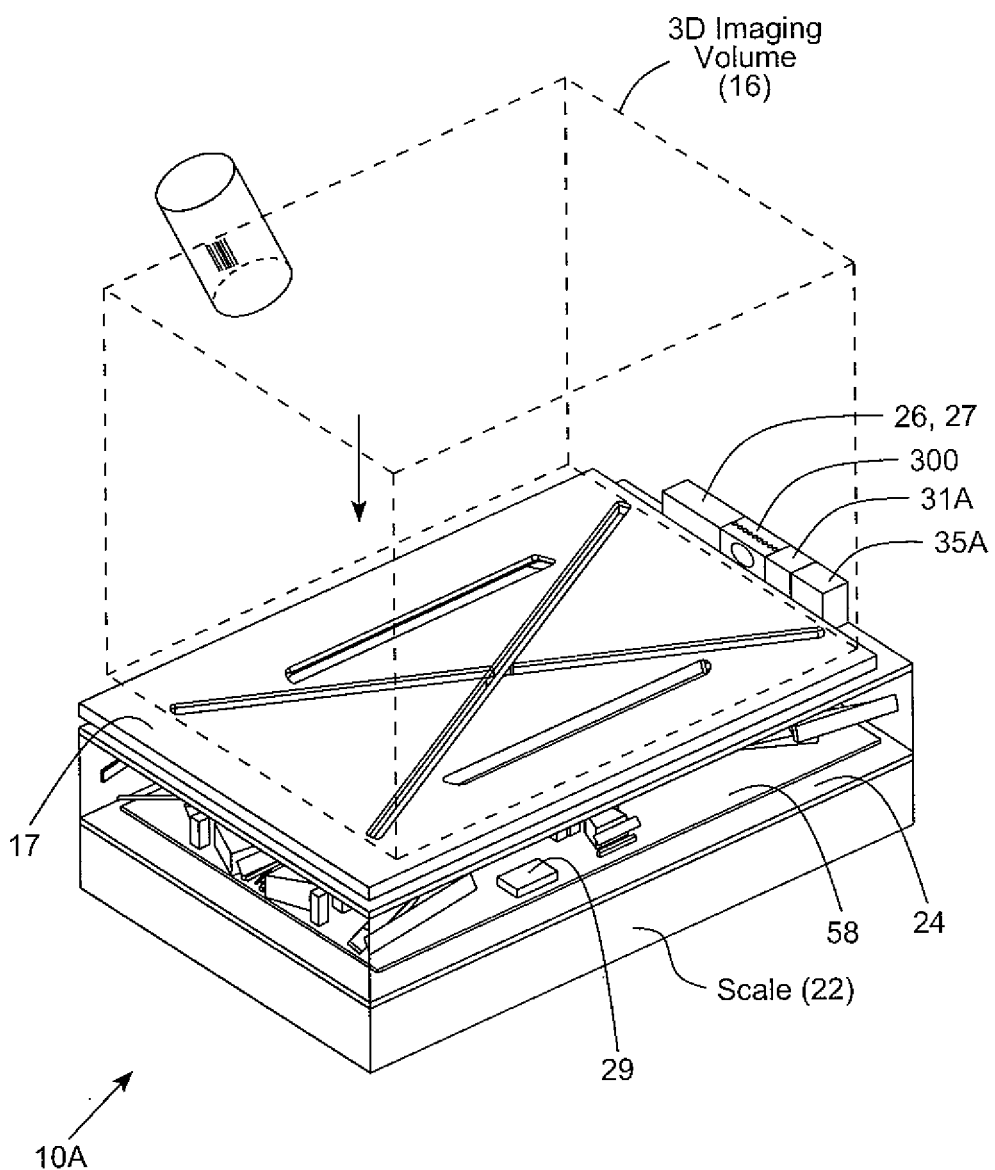
FIG. 2 is a first perspective view of the bar code symbol reading system shown removed from its POS environment in FIG. 1, and provided with an imaging window protection plate (mounted over a glass light transmission window) and having a central X aperture pattern and a pair of parallel apertures aligned parallel to the sides of the system, for the projection of coplanar illumination and imaging planes from a complex of coplanar illumination and imaging stations mounted beneath the imaging window of the system.
Figure 3A:
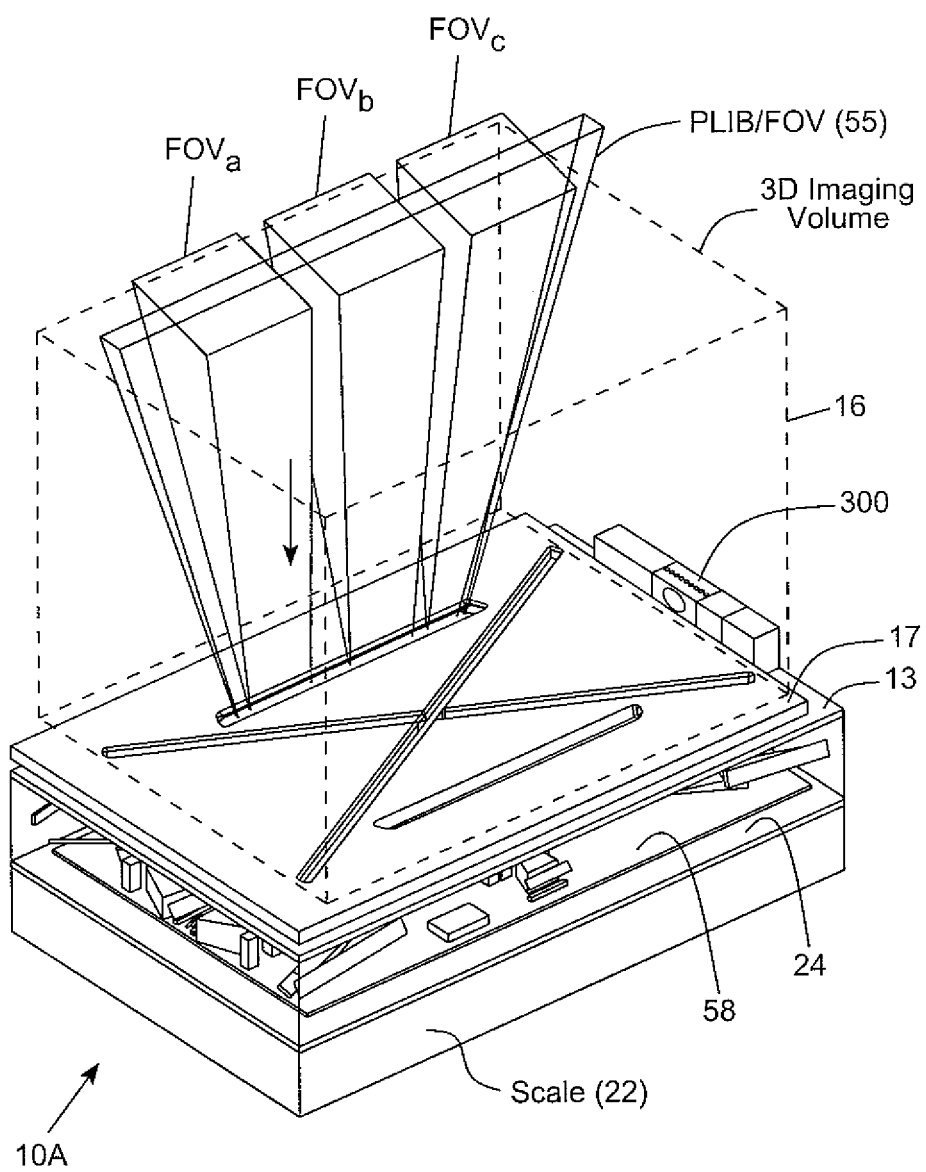
FIG. 3A is a perspective view of a first illustrative embodiment of the POS-based bar code symbol reading system, shown installed in the retail POS environment of FIG. 1, wherein each coplanar illuminating and linear imaging station employs a linear array of VLDs or LEDs to generate a substantially planar illumination beam (PLIB) which is coplanar with the field of view of the linear (1D) image sensing array employed in the station, and wherein high-speed imaging-based motion/velocity sensors (i.e. detectors) are deployed at the station for the purpose of (i) detecting whether or not an object is present within the FOV at any instant in time, and (ii) detecting the motion and velocity of objects passing through the FOV of the linear image sensing array at the station, controlling camera parameters in real-time, including the clock frequency of the linear image sensing array, and (iii) automatically providing the system operator with visual and/or audio indication based feedback on the "pass-through-speed" of objects transported through the 3D imaging volume.
Figure 3B:
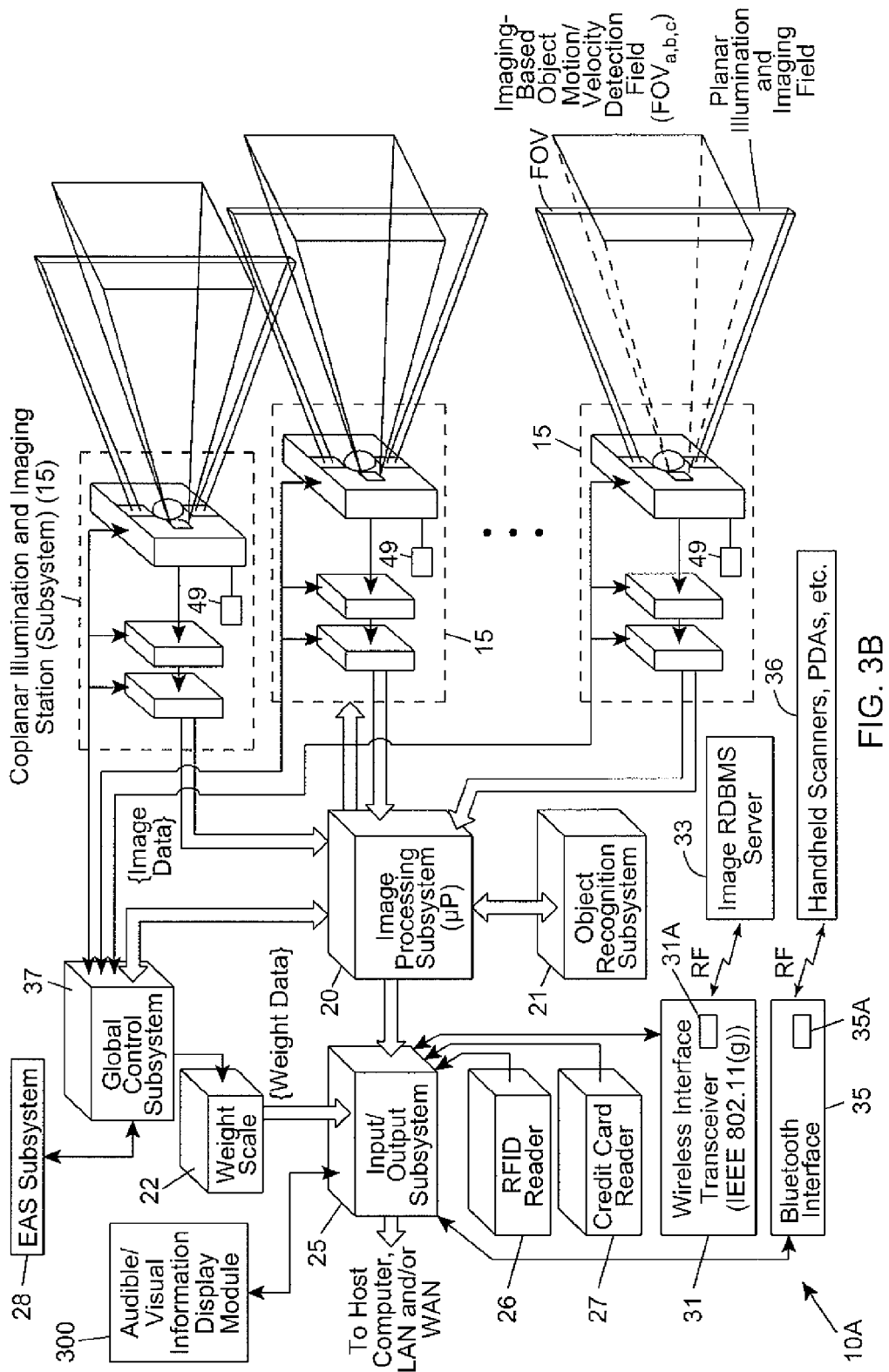
FIG. 3B is a block schematic representation of the system embodiment of FIG. 3A, wherein a complex of coplanar illuminating and linear imaging stations support (i) automatic image formation and capture along each coplanar illumination and imaging plane within the 3D imaging volume, (ii) imaging-based object motion/velocity sensing and intelligent automatic illumination control within the 3D imaging volume, and (iii) automatic display of object scanning speed/velocity measures or estimates to provide the system operator with feedback in order to optimize scanning throughput.
Figure 3C:
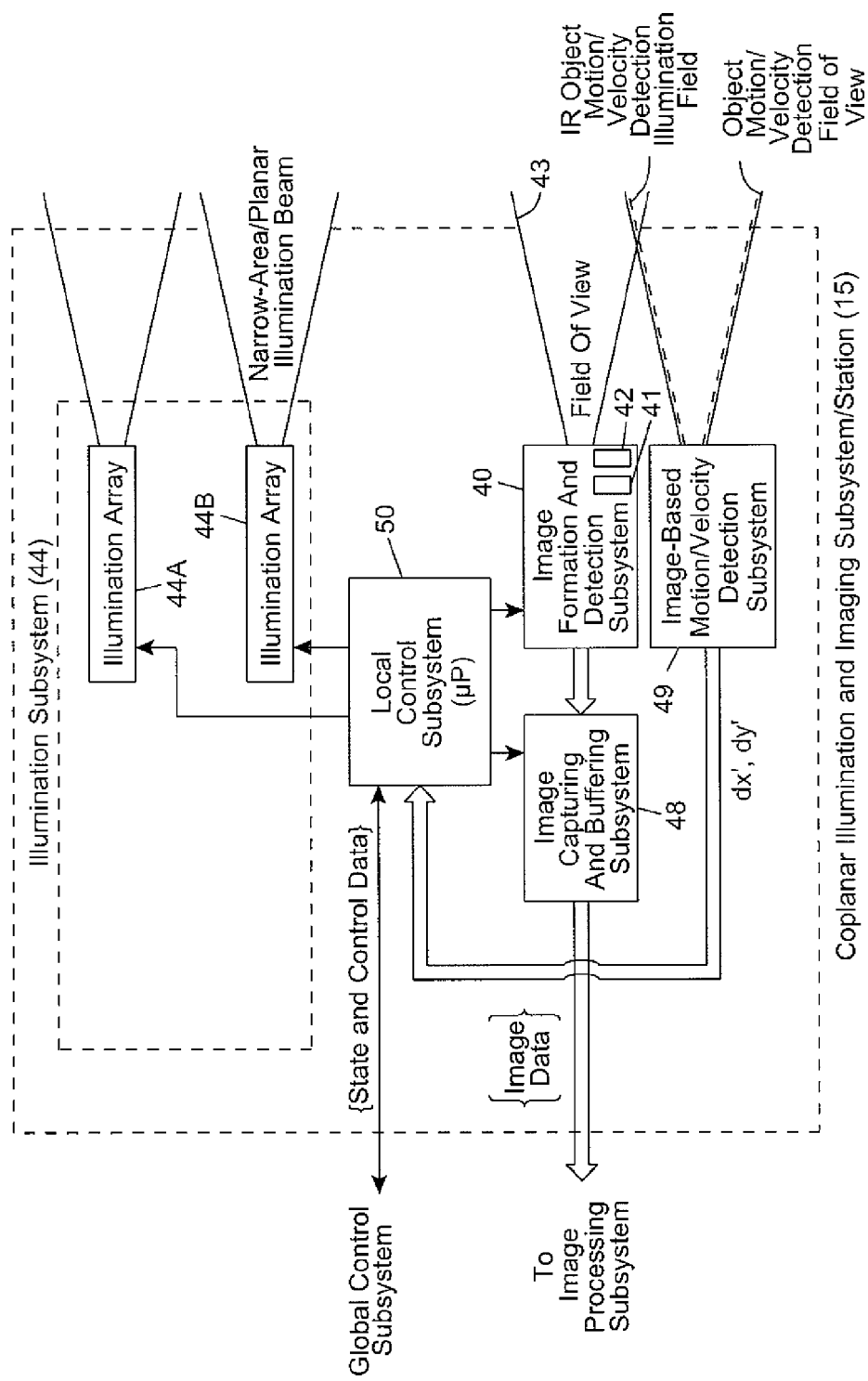
FIG. 3C is a block schematic representation of one of the coplanar illumination and imaging stations employed in the system embodiment of FIG. 3B, showing its planar illumination array (PLIA), its linear image formation and detection subsystem, its image capturing and buffering subsystem, its high-speed imaging based object motion/velocity detecting (i.e. sensing) subsystem, and its local control subsystem.
Figure 3D:
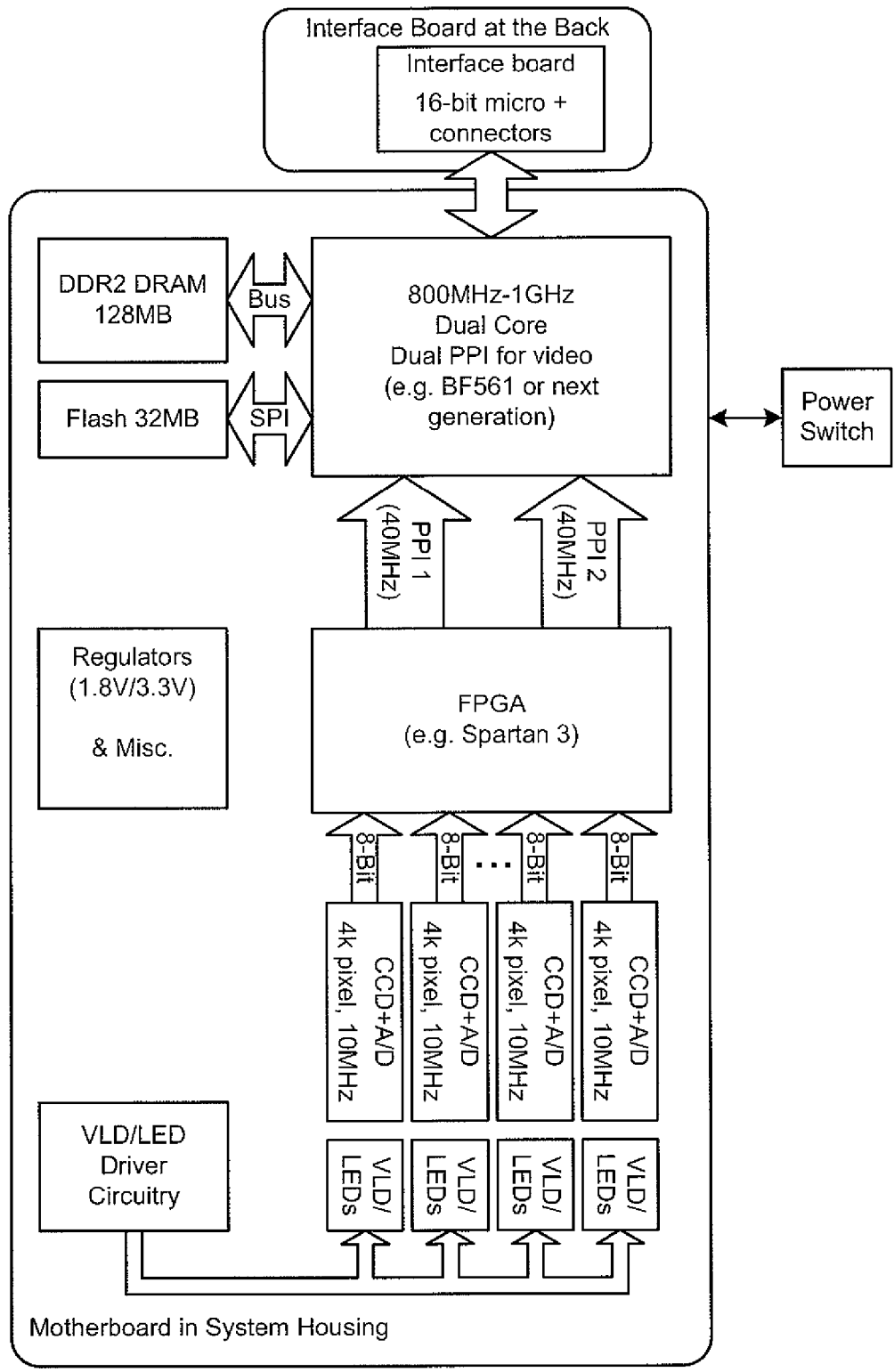
FIG. 3D is a schematic diagram describing an exemplary embodiment of a computing and memory architecture platform for implementing the digital image capture and processing system described in FIGS. 3A, 3B and 3C.
Figure 3E:
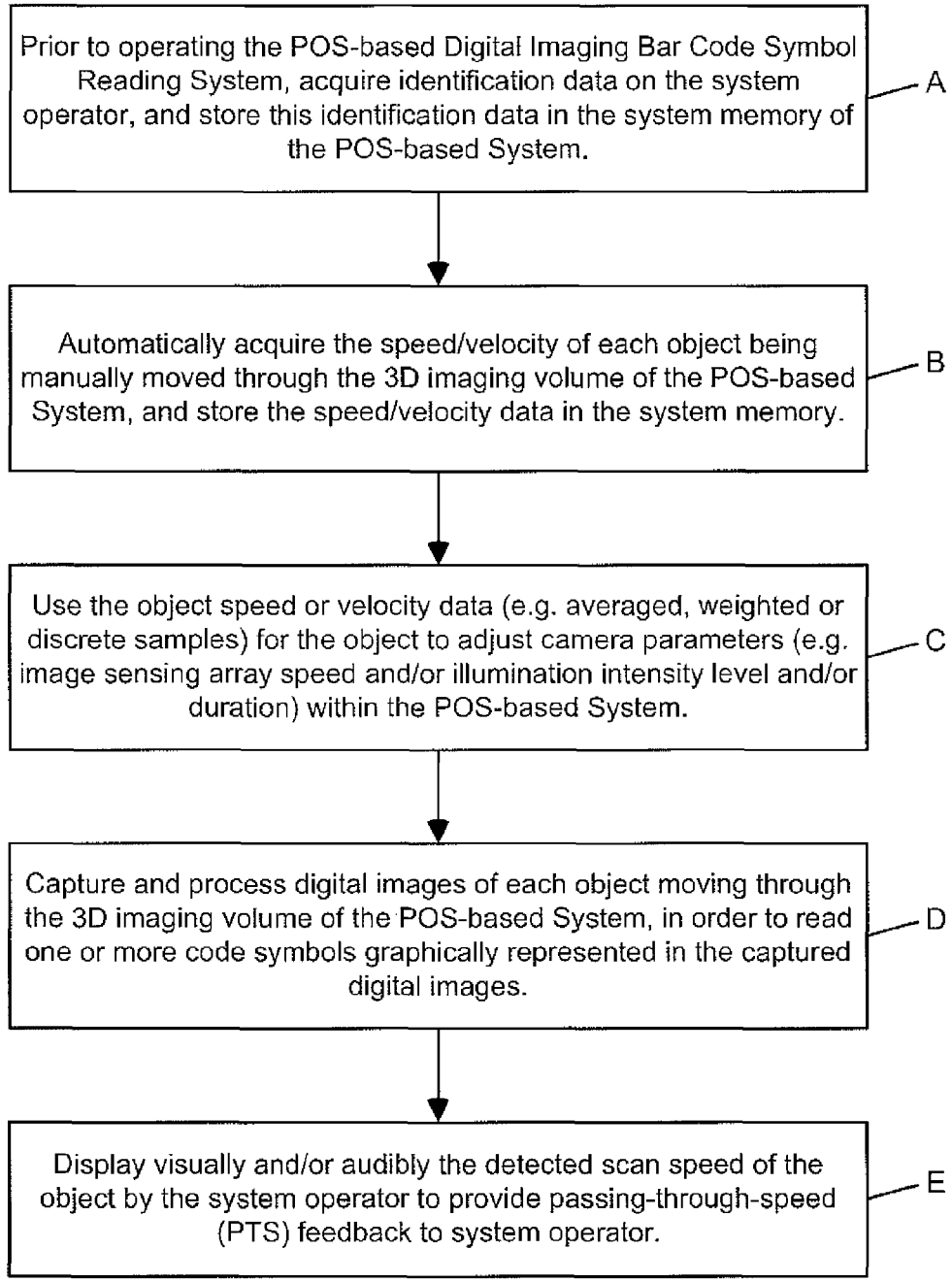
FIG. 3E is a flow chart setting forth the major steps in the POS scanning optimization method supported by the system of first illustrative embodiment, involving the steps of (i) acquiring identification information on the system operator (i.e. cashier), (ii) automatically acquiring/capturing and storing the speed/velocity of each object being manually transported through the 3D imaging volume of the system, (iii) using the object speed/velocity data to adjust camera parameters (e.g. image sensing array speed, and/or illumination intensity level and/or duration) within the system, (iv) capturing and processing digital images of the object in order to read one or more code symbols graphically represented in the captured digital images, and (v) visually and/or audibly displaying the detected scan speed of objects by the system operator, to provide passing-through-speed (PTS) feedback to the system operator, and thereby optimizing scanner checkout speed and POS throughput.

For example, in the illustrative embodiment shown in FIGS. 2 through 3E the system employs imaging-based object motion and velocity sensing technology practiced at the local subsystem level.

Figure 4A:
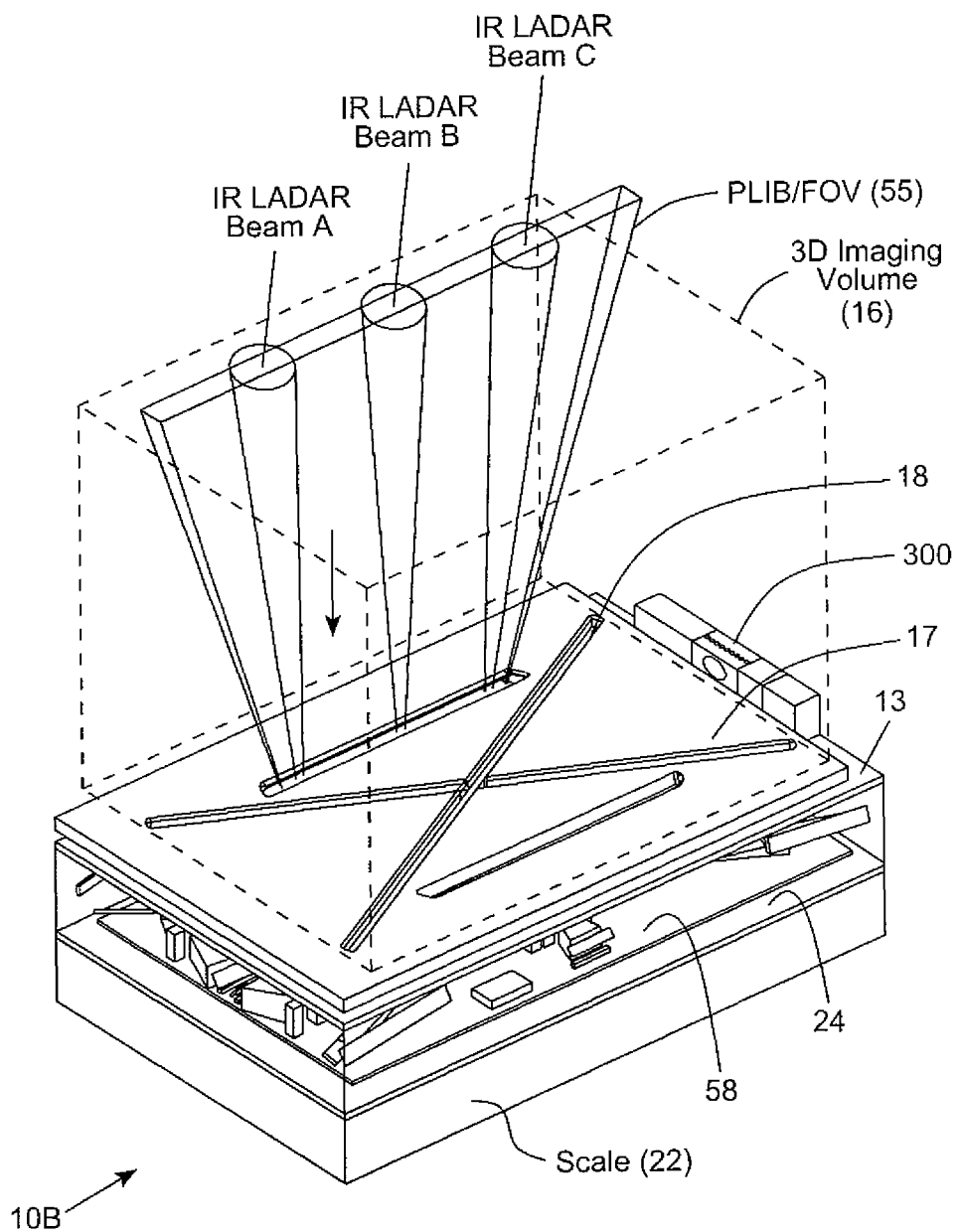
FIG. 4A is a perspective view of a second illustrative embodiment of the POS-based bar code symbol reading system, shown installed in the retail POS environment of FIG. 1, wherein each coplanar illuminating and linear imaging station employs a linear array of VLDs or LEDs to generate a substantially planar illumination beam (PLIB) which is coplanar with the field of view of the linear (1D) image sensing array employed in the station, and wherein multiple high-speed IR Pulse-Doppler LIDAR based motion/velocity sensors are deployed at the station, for the purpose of (i) detecting whether or not an object is present within the FOV at any instant in time, and (ii) detecting the motion and velocity of objects passing through the FOV of the linear image sensing array, controlling camera parameters in real-time, including the clock frequency of the linear image sensing array, and (iii) automatically providing the system operator with visual and/or audio indication based feedback on the speed of objects transported through the 3D imaging volume.
Figure 4B:
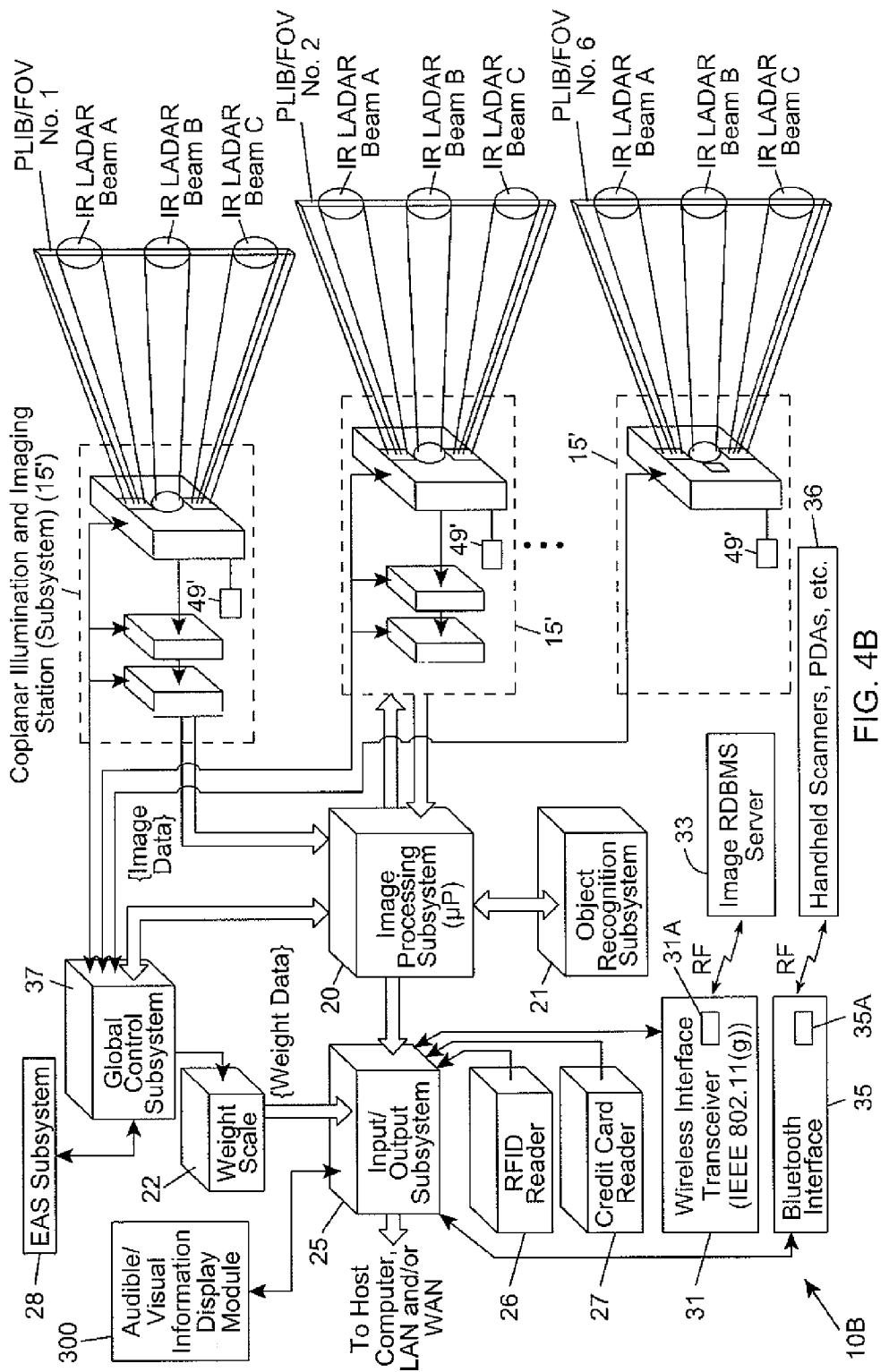
FIG. 4B is a block schematic representation of the system embodiment of FIG. 4, wherein a complex of coplanar illuminating and linear imaging stations support (i) automatic image formation and capture along each coplanar illumination and imaging plane within the 3D imaging volume, (ii) imaging-based object motion/velocity sensing and intelligent automatic illumination control within the 3D imaging volume, and (iii) automatic display of object scanning speed/velocity measures or estimates to provide the system operator with feedback in order to optimize scanning throughput.
Figure 4C:
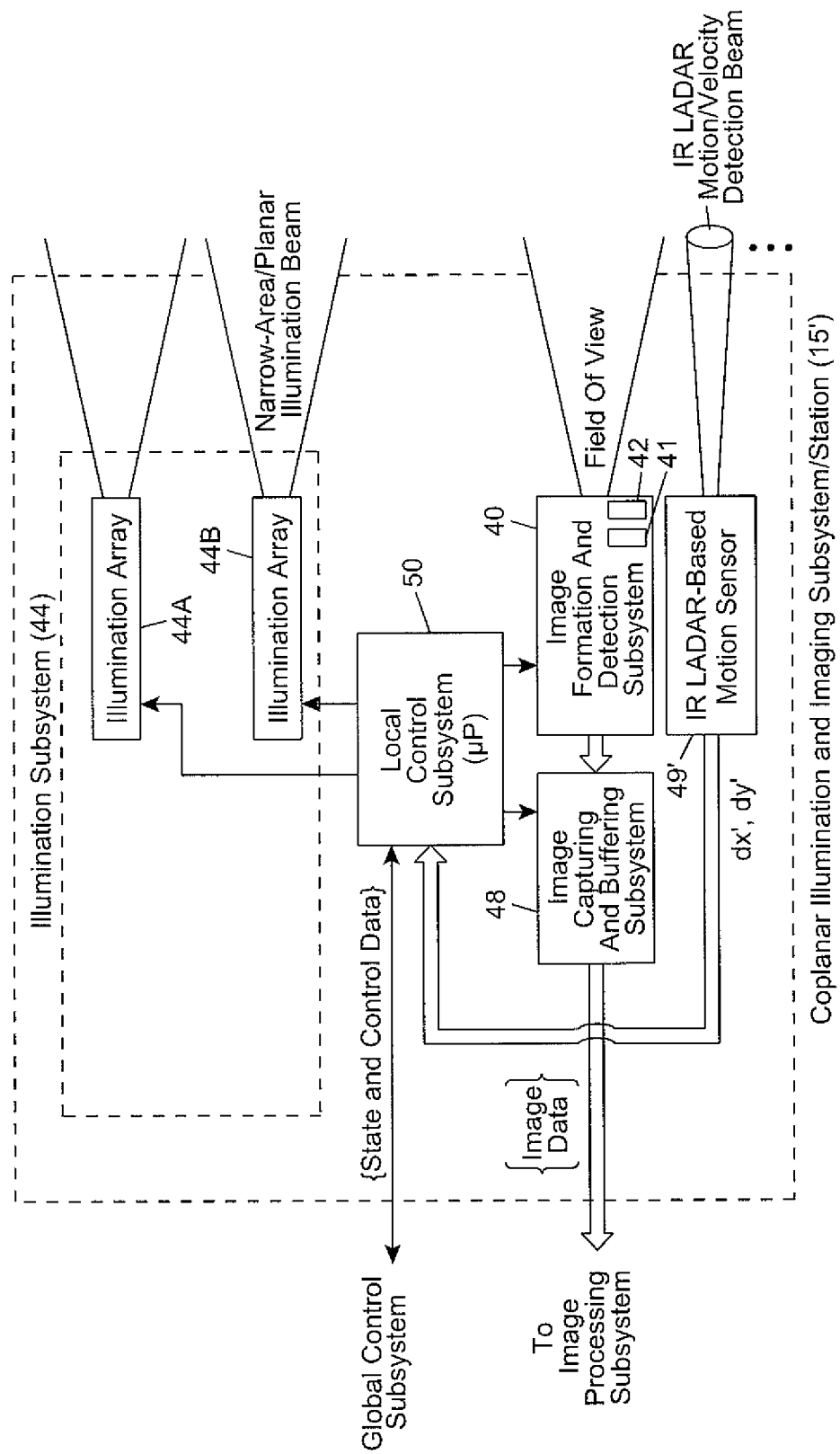
FIG. 4C is a block schematic representation of one of the coplanar illumination and imaging stations employed in the system embodiment of FIG. 4B, showing its planar illumination array (PLIA), its linear image formation and detection subsystem, its image capturing and buffering subsystem, its high-speed IR Pulse-Doppler LIDAR based object motion/velocity detecting (i.e. sensing) subsystem, and its local control subsystem.
Figure 4D:
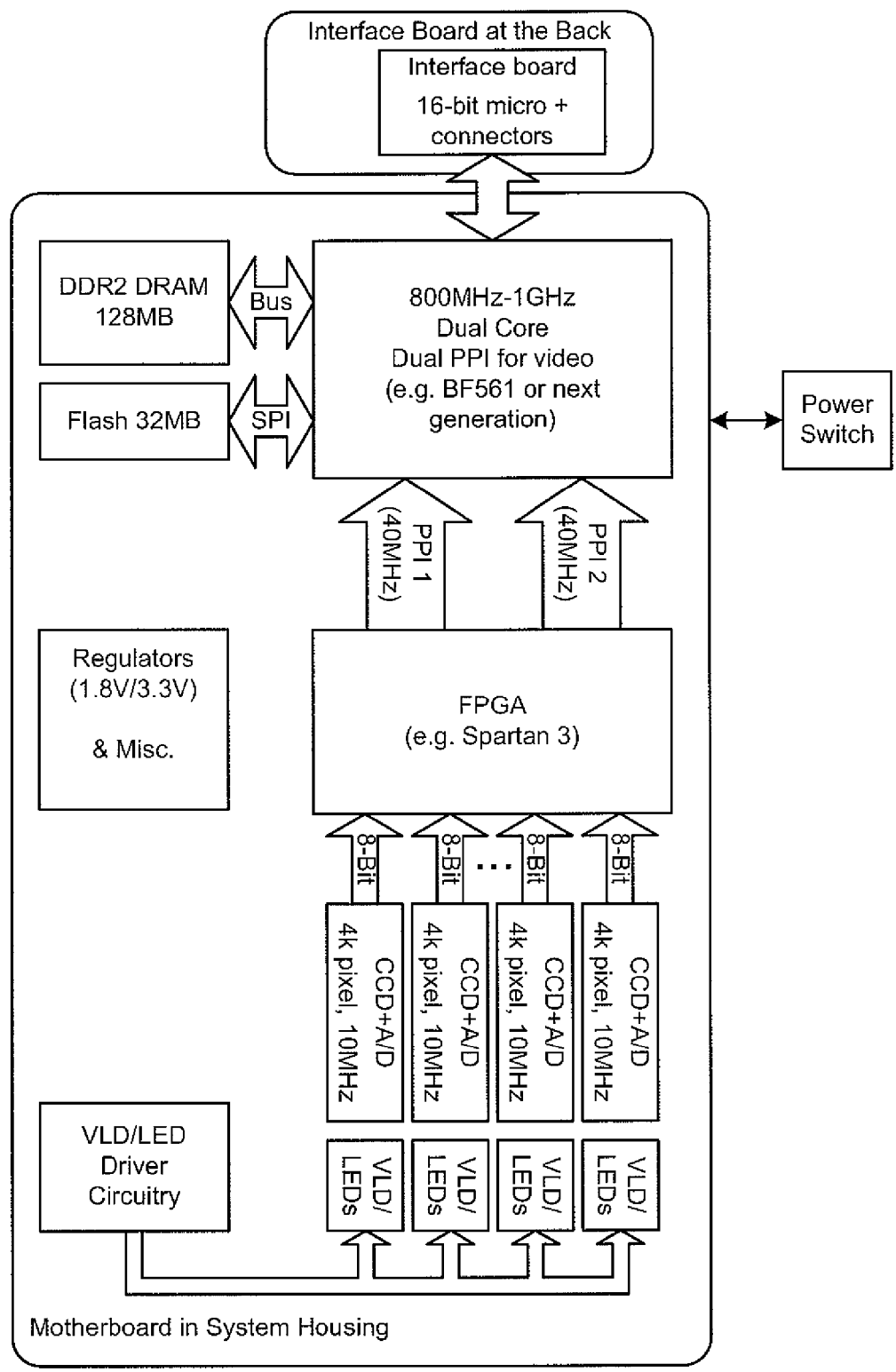
FIG. 4D is a schematic diagram describing an exemplary embodiment of a computing and memory architecture platform for implementing the digital image capture and processing system described in FIGS. 4A, 4B and 4C.
Figure 4E:
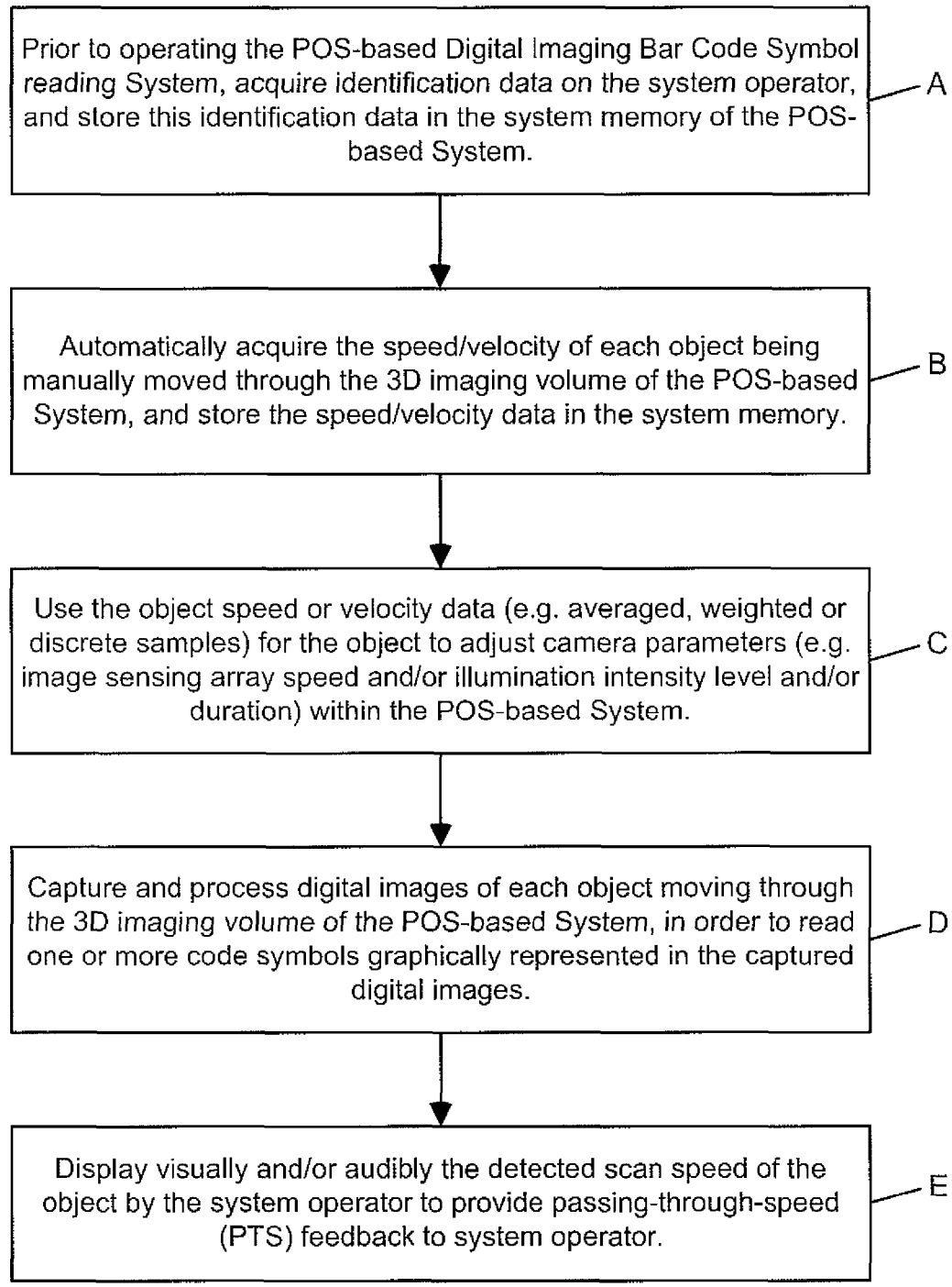
FIG. 4E is a flow chart setting forth the major steps of the POS scanning optimization method supported by the digital-imaging based bar code symbol reading system shown in FIGS. 4A and 4B, involving the steps of (i) acquiring identification information on the system operator (i.e. cashier), (ii) automatically acquiring/capturing and storing the speed/velocity of each object being manually transported through the 3D imaging volume of the system, (iii) using the object speed/velocity data to adjust camera parameters (e.g. image sensing array speed, and/or illumination intensity level and/or duration) within the system, (iv) capturing and processing digital images for the object in order to read one or more code symbols graphically represented in the captured digital images, and (v) visually and/or audibly displaying the detected scan speed of objects by the system operator, to provide passing-through-speed (PTS) feedback to the system operator, and thereby optimizing scanner checkout speed and POS throughput.

In the illustrative embodiment shown in FIGS. 4 through 4E, the system employs IR Pulse-Doppler LIDAR based object motion and velocity detection techniques practiced at a local subsystem level.

In the illustrative embodiment shown in FIGS. 5 through 5E, the system employs imaging-based object motion/velocity detection techniques practiced at the global system level.

In the illustrative embodiment shown in FIGS. 6 through 6C, the system employs IR-based object motion and velocity detection techniques practiced at a global system level.

By continuously collecting or receiving updated motion and velocity/speed data regarding objects moved through, or presented within the 3-D imaging or scanning volume of the system, the system can automatically display object scanning speed/velocity to provide the system operator with pass-through-feedback in an effort to optimize scanning throughput.

Such collected pass-through speed data for a particular system operator (i.e. cashier or sales clerk) can be displayed in real-time to train the system operator to achieve higher levels of checkout performance. Also, collected pass-through-speed data for any given system operator can be stored in a local or centralized relational database management system (RDBMS), and made accessible to managers using remote client machines, over communications networks (e.g. Internet) for review and analysis with or within remote management software.

It is appropriate at this juncture to now describe the various illustrative embodiments in greater technical detail.

First Illustrative Embodiment of the Bar Code Symbol Reading System Employing Imaging-Based Object Motion and Velocity Sensing Technology As shown in FIGS. 2 and 3A, the bar code symbol reading system of the first illustrative embodiment 10A includes a system housing having an optically transparent (glass) imaging window 13, preferably covered by an imaging window protection plate 17 which is provided with a pattern of apertures 18. These apertures permit the projection of a plurality of coplanar illumination and imaging planes from the complex of coplanar illumination and imaging stations 15A through 15F.

As shown in the system diagram of FIG. 3B, system 10 generally comprises: a complex of coplanar illuminating and linear imaging stations (15A through 15F), each constructed using the illumination arrays and linear image sensing array technology; an multi-processor multi-channel image processing subsystem 20 for supporting automatic image processing based bar code symbol reading and optical character recognition (OCR) along each coplanar illumination and imaging plane, and corresponding data channel within the system; a software-based object recognition subsystem 21, for use in cooperation with the image processing subsystem 20, and automatically recognizing objects (such as vegetables and fruit) at the retail POS while being imaged by the system; an electronic weight scale module 22 employing one or more load cells positioned centrally below the system's structurally rigid platform, for bearing and measuring substantially all of the weight of objects positioned on the window 13 or window protection plate 17, and generating electronic data representative of the measured weight of such objects; an input/output subsystem 25 for interfacing with the image processing subsystem 20, the electronic weight scale 22, RFID reader 26, credit-card reader 27, Electronic Article Surveillance (EAS) Subsystem 28 (including a Sensormatic® EAS tag deactivation block 29 integrated in system, and an audible/visual information display subsystem (i.e. module) 300 for visually and/or audibly displaying indications (e.g. measures or estimates) of product scanning speed/velocity in real-time at the POS station, and/or (ii) measures of system performance, such as checkout throughput, to assist the cashier in optimizing scanning and checkout speed, and thus improve worker productivity.

The primary function of each coplanar illumination and imaging station in the bar code symbol reading system 10A, indicated by reference numeral 15, is to capture digital linear (1D) or narrow-area images along the field of view (FOV) of its coplanar illumination and imaging planes using laser or LED-based illumination, depending on the system design. These captured digital images are then buffered, and decode-processed using linear (1D) type image capturing and processing based bar code reading algorithms, or can be assembled together and buffered to reconstruct 2D images for decode-processing using 1D/2D image processing based bar code reading techniques, as taught in Applicants' U.S. Pat. No. 7,028,899 B2, incorporated herein by reference. Also, the complex of coplanar and/or coextensive illuminating and imaging stations 15A through 15F, can be constructed using (i) VLD-based and/or LED-based illumination arrays and linear and/area type image sensing arrays, and (ii) real-time object motion/velocity detection technology embedded within the system architecture. The resulting system 10 enables: (1) intelligent automatic illumination control within the 3D imaging volume of the system; (2) automatic image formation and capture along each coplanar illumination and imaging plane therewithin; (3) real-time display of object/product scanning speed at the POS station to assist the cashier in optimizing scanning and checkout speed, and thus improve worker productivity; and (4) advanced automatic image processing operations supporting diverse kinds of value-added information-based services delivered in diverse end-user environments, including retail POS environments as well as industrial environments.

In general, each coplanar illumination and imaging station 15 is able to automatically change its state of operation from Object Motion and Velocity Detection to Bar Code Reading in response to automated detection of an object with at least a portion of the FOV of its coplanar illumination and imaging plane. By virtue of this feature, each coplanar illumination and imaging station in the system is able to automatically and intelligently direct LED or VLD illumination at an object only when and for so long as the object is detected within the FOV of its coplanar illumination and imaging plane. This intelligent capacity for local illumination control maximizes illumination being directed towards objects to be imaged, and minimizes illumination being directed towards consumers or the system operator during system operation in retail store environments, in particular.

In order to support automated object recognition functions (e.g. vegetable and fruit recognition) at the POS environment, image capturing and processing based object recognition subsystem 21 (i.e. including Object Libraries etc.) cooperates with the multi-channel image processing subsystem 20 so as to (i) manage and process the multiple channels of digital image frame data generated by the coplanar illumination and imaging stations 15, (ii) extract object features from processed digital images, and (iii) automatically recognize objects at the POS station which are represented in the Object Libraries of the object recognition subsystem 21.

While laser illumination (e.g. VLD) sources have many advantages for generating coplanar laser illumination planes for use in the image capture and processing systems (i.e. excellent power density and focusing characteristics), it is understood that speckle-pattern noise reduction measures will need to be practiced in most applications. In connection therewith, the advanced speckle-pattern noise mitigation methods and apparatus disclosed in Applicants' U.S. Pat. No. 7,028,899 B2, incorporated herein by reference in its entirety as if fully set forth herein, can be used to substantially reduce speckle-noise power in digital imaging systems employing coherent illumination sources.

In contrast, LED-based illumination sources can also be used to generate planar illumination beams (planes) for use in the image capture and processing systems. Lacking high temporal and spatial coherence properties, the primary advantage associated with LED technology is lack of speckle-pattern noise. Some significant disadvantages with LED technology are the inherent limitations in focusing characteristics, and power density generation. Many of these limitations can be addressed in conventional ways to make LED arrays suitable for use in the digital image capture and processing systems and methods.

In some embodiments, it may be desired to use both VLD and LED based sources of illumination to provide hybrid forms of illumination within the imaging-based bar code symbol reading systems.

In FIG. 6B, the bar code symbol reading module employed along each channel of the multi-channel image processing subsystem 20 can be realized using SwiftDecoder® Image Processing Based Bar Code Reading Software from Omniplanar Corporation, New Jersey, or any other suitable image processing based bar code reading software. Also, the system provides full support for (i) dynamically and adaptively controlling system control parameters in the digital image capture and processing system, as disclosed and taught in Applicants' U.S. Pat. Nos. 7,607,581 and 7,464,877 as well as (ii) permitting modification and/or extension of system features and function, as disclosed and taught in U.S. Pat. No. 7,708,205, each said patent being incorporated herein by reference.

As shown in FIG. 3C, an array of VLDs or LEDS can be focused with beam shaping and collimating optics so as to concentrate their output power into a thin illumination plane which spatially coincides exactly with the field of view of the imaging optics of the coplanar illumination and imaging station, so very little light energy is wasted. Each substantially planar illumination beam (PLIB) can be generated from a planar illumination array (PLIA) formed by a plurality of planar illumination modules (PLIMs) using either VLDs or LEDs and associated beam shaping and focusing optics, taught in greater technical detail in Applicants U.S. Pat. Nos. 6,898,184, and 7,490,774, each incorporated herein by reference in its entirety. Preferably, each planar illumination beam (PLIB) generated from a PLIM in a PLIA is focused so that the minimum width thereof occurs at a point or plane which is the farthest object (or working) distance at which the system is designed to capture images within the 3D imaging volume of the system, although this principle can be relaxed in particular applications to achieve other design objectives.

As shown in FIGS. 3B and 3C, each coplanar illumination and imaging station 15 employed in the system of FIGS. 2 and 3A comprises: an illumination subsystem 44 including a linear array of VLDs or LEDs 45 and associated focusing and cylindrical beam shaping optics (i.e. planar illumination arrays PLIAs), for generating a planar illumination beam (PLIB) 61 from the station; a linear image formation and detection (IFD) subsystem 40 having a camera controller interface (e.g. realized as a field programmable gate array or FPGA) for interfacing with the local control subsystem 50, and a high-resolution linear image sensing array 41 with optics 42 providing a field of view (FOV) 43 on the image sensing array that is coplanar with the PLIB produced by the linear illumination array 45, so as to form and detect linear digital images of objects within the FOV of the system; a local control subsystem 50 for locally controlling the operation of subcomponents within the station, in response to control signals generated by global control subsystem 37 maintained at the system level, shown in FIG. 3B; an image capturing and buffering subsystem 48 for capturing linear digital images with the linear image sensing array 41 and buffering these linear images in buffer memory so as to form 2D digital images for transfer to image-processing subsystem 20 maintained at the system level, as shown in FIG. 3B, and subsequent image processing according to bar code symbol decoding algorithms, OCR algorithms, and/or object recognition processes; a high-speed image capturing and processing based motion/velocity sensing subsystem 49 for motion and velocity data to the local control subsystem 50 for processing and automatic generation of control data that is used to control the illumination and exposure parameters of the linear image formation and detection system within the station. Details regarding the design and construction of planar illumination and imaging module (PLIIMs) can be found in Applicants' U.S. Pat. No. 7,028,899 B2, incorporated herein by reference.

In an illustrative embodiment, the high-speed image capturing and processing based motion/velocity sensing subsystem 49 may comprise the following components: an area-type image acquisition subsystem with an area-type image sensing array and optics for generating a field of view (FOV) that is preferably spatially coextensive with the longer dimensions of the FOV 43 of the linear image formation and detection subsystem 40; an area-type (IR) illumination array for illuminating the FOV of motion/velocity detection subsystem 49; and an embedded digital signal processing (DSP) image processor, for automatically processing 2D images captured by the digital image acquisition subsystem. The DSP image processor processes captured images so as to automatically abstract, in real-time, motion and velocity data from the processed images and provide this motion and velocity data to the local control subsystem 50 for the processing and automatic generation of control data that is used to control the illumination and exposure parameters of the linear image formation and detection system within the station.

In the illustrative embodiment shown in FIGS. 2 through 3C, each image capturing and processing based motion/velocity sensing subsystem 49 continuously and automatically computes the motion and velocity of objects passing through the planar FOV of the station, and uses this data to generate control signals that set the frequency of the clock signal used to read out data from the linear image sensing array 41 employed in the linear image formation and detection subsystem 40 of the system. The versions of the image capturing and processing based motion/velocity sensing subsystem 49 are schematically illustrated in U.S. Pat. No. 7,540,424, incorporated herein by reference.

The image capturing and processing based motion/velocity detection subsystem 49 employs either a linear-type or area-type of image sensing array to capture images of objects passing through the FOV of the image formation and detection subsystem. Then, DSP-based image processor computes motion and velocity data regarding object(s) within the FOV of the linear image formation and detection (IFD) subsystem 40, and this motion and velocity data is then provided to the local subsystem controller 50 so that it can generate (i.e. compute) control data for controlling the frequency of the clock signal used in reading data out of the linear image sensing array of the image formation and detection subsystem. The frequency control algorithm described in U.S. Pat. No. 7,540,424, supra, can be used to control the clock frequency of the linear image sensing array 41 employed in the IFD subsystem 40 of the system.

When any one of the coplanar illumination and imaging stations is configured in its Object Motion/Velocity Detection State, there is the need to illuminate to control the illumination that is incident upon the image sensing array employed within the object motion/velocity detector subsystem 49. In general, there are several ways to illuminate objects during the object motion/detection mode (e.g. ambient, laser, LED-based), and various illumination parameters can be controlled while illuminating objects being imaged by the image sensing array 41 of the object motion/velocity detection subsystem 49 employed at any station in the system. Also, given a particular kind of illumination employed during the Object Motion/Velocity Detection Mode, there are various illumination parameters that can be controlled, namely: illumination intensity (e.g. low-power, half-power, full power); illumination beam width (e.g. narrow beam width, wide beam width); and illumination beam thickness (e.g. small beam thickness, large beam thickness). Based on these illumination control parameters, several different illumination control methods can be implemented at each illumination and imaging station in the system. Such methods are disclosed on detail in U.S. Pat. No. 7,540,424 and US Publication No. 20080283611 A1, supra.

FIG. 3D describes an exemplary embodiment of a computing and memory architecture platform that can be used to implement the omni-directional image capturing and processing based bar code symbol reading system described in FIGS. 3 and 3C. As shown, this hardware computing and memory platform can be realized on a single PC board 58, along with the electro-optics associated with the illumination and imaging stations and other subsystems, and therefore functioning as an optical bench as well. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

Referring to FIG. 3E, a preferred method of POS scanning optimization method, supported by the system of the first illustrative embodiment 10A, will now be described in detail.

As indicated at Block A in FIG. 3E, the first step of the method involves, prior to system operation, acquiring identification data on the system operator (e.g. cashier or sales clerk) and then storing this identification information data in the system memory of the system. Such identification information may include one or more of the following items: the system operator's name; employee identification number; etc.

As indicated at Block B in FIG. 3E, the second step of the method involves automatically acquiring the speed/velocity of each object being manually moved through the 3D imaging volume of the system, and storing the acquired speed/velocity data in system memory.

As indicated at Block C, the third step of the method involves using the object speed or velocity data (e.g. averaged, weighed or discrete samples) to adjust camera parameters (e.g. image sensing array speed, illumination duration and/or intensity, etc) within the system.

As indicated at Block D, the fourth step of the method involves capturing and processing digital images of each object moved through the 3D imaging volume of the system, in order to read one or more code symbols graphically represented in the captured digital images.

As indicated at Block E, the fifth step of the method involves using the PTS information display subsystem 300 to visually and/or acoustically display, during system operation, the detected object scan speed associated with the identified system operator, for the purpose of providing the system operator with a useful measure of pass-through-speed (PTS) feedback during product scanning and checkout operations conducted at the POS station.

In general, there are many different ways in which to display indications of detected object scan speed (i.e. PTS) that is associated with an identified system operator. How such measures and indications are displayed depends on the type of PTS information display subsystem 300 deployed at the POS system.

In the event that the PTS information display subsystem 300 in system 10A supports the numerical display of PTS values at the POS station, then a preferred way of displaying pass through speed (PTS) would be to visually display a numerical figure corresponding to (i) the actually measured (near instantaneous) product scan speed divided by (ii) the maximal product scan speed that can be achieved by the system, as determined either empirically or theoretically. This way the displayed figure can represent a normalized value of maximum possible product scan speed that might be achieved at a given POS station, i.e. displayed percentage % of the maximal speed achievable by the system. In such instances, there is no need for the PTS information display subsystem to display the units of measure because the computed measure will be dimensionless, i.e. a percentage value of maximum possible speed. Notably, the maximum or optimal product scan speed that can be achieved at a given POS station can be measured empirically through field testing, or determined through theoretical calculation.

In alternative embodiments of the PTS information display subsystem 300, the normalizing value used to compute the PTS figure to be displayed can be an average of the product scanning speed values that have been monitored and recorded for the particular system operator in question, over a given period of time, so that the displayed PTS figure is normalized by the system operator by the system operator's recent average product scan speed. Of course there are other ways to compute the PTS values to be numerically displayed at the POS station.

Figure 2A:
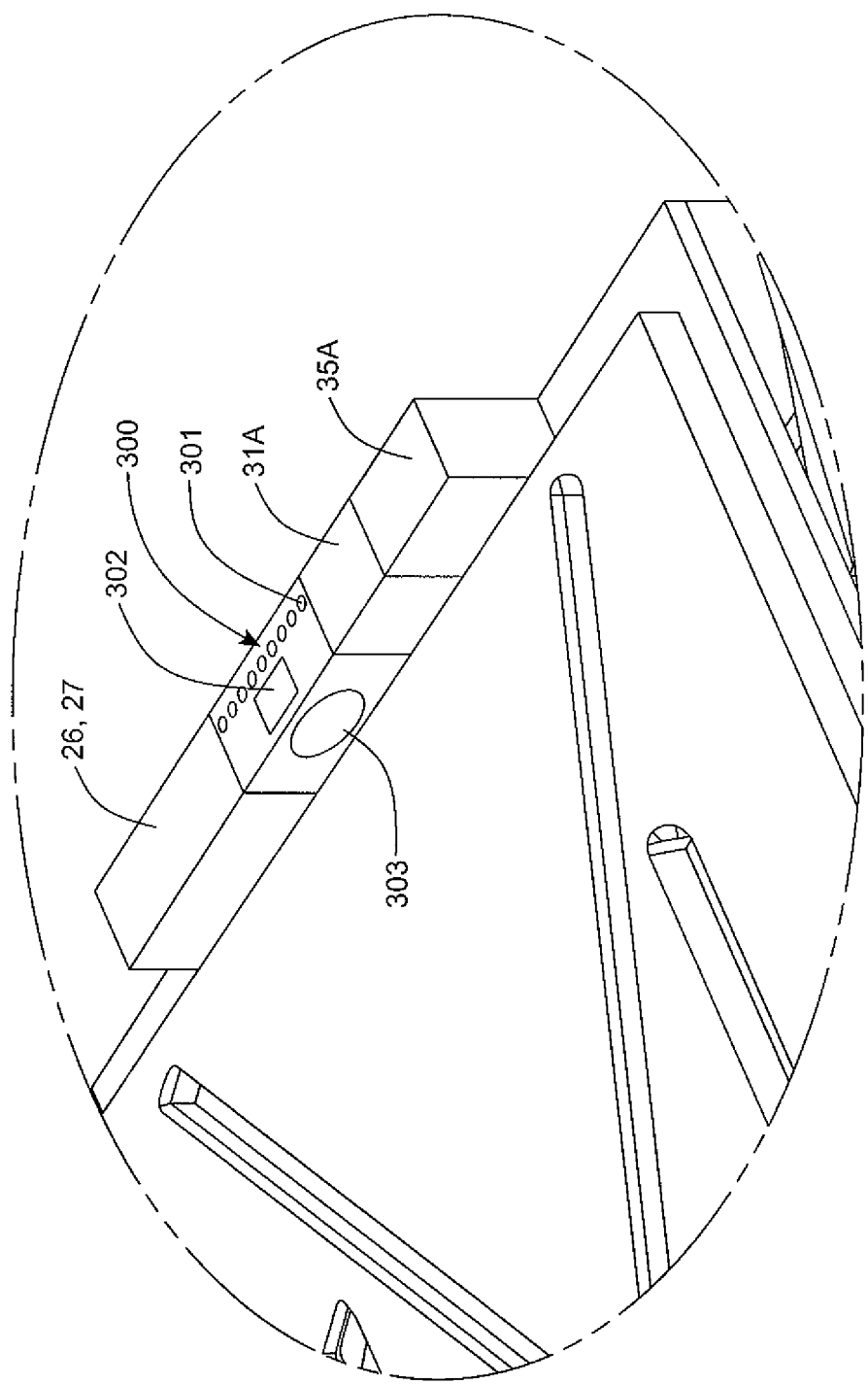

In the event that the PTS information display subsystem 300 supports the display of a bar or line graph type of visual display at the POS station using LED 301 and/or LCD display 302, then there are a variety of different ways to visually display PTS values. For example, consider the case of visually displaying three different ranges of PTS using the visible LED array 301 shown in FIG. 2A, namely: (i) when the PTS is too SLOW, one or more LEDs of a particular color (e.g. YELLOW) are driven to illuminated YELLOW light, or an LED at a particular location driven to illuminate a particular color of light; (ii) when the PTS is too FAST, one or more LEDs 301 of a particular color (e.g. RED) are driven to illuminated RED light, or one or more LEDs at a particular location are driven to illuminate a particular color of light; and (iii) when the PTS is within a desired or specified range (e.g. predetermined by the system operator during a training session, determined by the system based on past performance; etc), one or more LEDs of a particular color (e.g. GREEN) are driven to illuminated GREEN light, or one or more LEDs at a particular location are driven to illuminate a particular color of light. As shown in FIG. 2A, the visual-type PTS information display subsystem described above can be realized using a single LED capable of generating three different colors of visible illumination, or by multiple discrete LEDs located at different relative display positions, and possibly capable different colors of light. In this illustrative embodiment, a range of computed PTS values can be assigned to a corresponding LED color or LED position, supported by the three-state visual display indication system, described above.

As an alternative, or in addition to color information, the PTS information display subsystem 300 can also display different types of visual information such as, but not limited to, graphics on a LCD display panel 302, and well as audio information produced from audio transducer 303 to indicate detected product scanning speeds supported by a particular system operator, and provide feedback to help improve the scanning behavior of any given system operator.

In the event that the PTS information display subsystem 300 supports audible/acoustical display of PTS values at the POS station, then there are a variety of ways to acoustically display PTS values using one or more audio transducers 303. For example, consider the case of audibly/acoustically displaying three different ranges of PTS, namely: (i) when the PTS is too SLOW, one or more acoustical transducers 303 are driven to produce a first discernable sound having a first pitch P1; (ii) when the PTS is too FAST, one or more transducers 303 are driven to produce a second discernable sound having a second pitch; and (iii) when the PTS is within a desired or specified range (e.g. predetermined by the system operator during a training session; determined by the system based on past performance, etc.), one or more transducers 303 are driven to produce a third discernable sound having a third pitch P3. This acoustical-type PTS information display subsystem 300 can be realized using a single piezo-acoustic transducer 303 capable of generating three different sounds of different pitch, or by multiple discrete piezo-electric transducers, each designed to generate sounds of different pitch to signal different detected pass-through speed events or the like. In this illustrative embodiment, a range of computed PTS values will be assigned to a corresponding pitch, supported by the three-state acoustical display indication system, 300 described above. Alternatively, the acoustical PTS indicator 303 described above can also generate a range of sounds having continuously modulated pitch, corresponding to an increase or decrease in PTS, as the case may be.

In yet other embodiments of the PTS information display subsystem 300, both visual and acoustical display capabilities can be combined into a single PTS information display subsystem, as shown in FIG. 2A, having one or more modes of operation, in which either visual, or acoustical PTS display capabilities are carried out, or both visual and acoustical PTS display capabilities are carried out simultaneously, as desired or required by the particular application at hand.

Also, the system of this illustrative embodiment can automatically adjust the system parameters according to a specific system operator. Also, the PTS data from a specific system operator can be used to customize the system according to the operator's average PTS. The average PTS or weighed average PTS of any system operator, who is registered with the system, can be measured and stored as a characteristic of the system operator in system memory, and the system can automatically change the sampling speed (line/second) of the image sensor (i.e. camera sensor) and/or illumination level of the illumination subsystem so as to correspond with the average PTS or weighted average PTS of the system operator using the system, to achieve optimal system performance and POS throughput.

The Second Illustrative Embodiment of the Bar Code Symbol Reading System Employing IR Pulse-Doppler LIDAR Based Object Motion/Velocity Detectors in Each Coplanar Illumination and Imaging Subsystem Thereof In FIG. 4A, a second illustrative embodiment of the bar code symbol reading system 10B is shown removed from its POS environment, with one coplanar illumination and imaging plane being projected through an aperture in its imaging window protection plate. In this illustrative embodiment, each coplanar illumination and imaging plane projected through the 3D imaging volume of the system has a plurality of IR Pulse-Doppler LIDAR based object motion/velocity sensing beams (A, B, C) that are spatially coincident therewith, for sensing in real-time the motion and velocity of objects passing therethrough during system operation. As shown in greater detail, IR Pulse-Doppler LIDAR based object motion/velocity sensing beams (A, B, C) are generated from a plurality of IR Pulse-Doppler LIDAR motion/velocity detection subsystems, which can be realized using a plurality of IR Pulse-Doppler LIDAR motion/velocity sensing chips mounted along the illumination array provided at each coplanar illumination and imaging station in the system.

In FIG. 4A, three such IR Pulse-Doppler LIDAR motion/velocity sensing chips (e.g. Philips PLN2020 Twin-Eye 850 nm IR Laser-Based Motion/Velocity Sensor System in a Package (SIP)) are employed in each station in the system to achieve coverage over substantially the entire field of view of the station.

As shown in FIG. 4B, the bar code symbol reading system 10B comprises: complex of coplanar illuminating and linear imaging stations 15A' through 15F' constructed using the illumination arrays and linear (CCD or CMOS based) image sensing arrays shown in FIG. 4C; a multi-processor image processing subsystem 20 for supporting automatic image processing based bar code symbol reading and optical character recognition (OCR) along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including a Sensormatic® EAS tag deactivation block integrated in system housing, and a Checkpoint® EAS antenna); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15' transmits frames of image data to the image processing subsystem 25, for state-dependent image processing and the results of the image processing operations are transmitted to the host system via the input/output subsystem 20. The bar code symbol reading module employed along each channel of the multi-channel image processing subsystem 20 can be realized using SwiftDecoder® Image Processing Based Bar Code Reading Software from Omniplanar Corporation, West Deptford, N.J., or any other suitable image processing based bar code reading software. Also, the system provides full support for (i) dynamically and adaptively controlling system control parameters in the digital image capture and processing system, as disclosed and taught in U.S. Pat. No. 7,607,581, as well as (ii) permitting modification and/or extension of system features and function, as disclosed and taught in U.S. Pat. No. 7,708,205.

As shown in FIG. 4C, each coplanar illumination and imaging station 15' employed in the system embodiment of FIG. 4B, comprises: a planar illumination array (PLIA) 44; a linear image formation and detection subsystem 40; an image capturing and buffering subsystem 48, at least one high-speed IR Pulse-Doppler LIDAR based object motion/velocity detecting (i.e. sensing) subsystem 49'; and a local control subsystem 50.

In the illustrative embodiment of FIG. 4, each IR Pulse-Doppler LIDAR based object motion/velocity sensing subsystem 49' can be realized using a high-speed IR Pulse-Doppler LIDAR based motion/velocity sensor (e.g. Philips PLN2020 Twin-Eye 850 nm IR Laser-Based Motion/Velocity Sensor (SIP). The purpose of this subsystem 49' is to (i) detect whether or not an object is present within the FOV at any instant in time, and (ii) detect the motion and velocity of objects passing through the FOV of the linear image sensing array, controlling camera parameters in real-time, including the clock frequency of the linear image sensing array, and (iii) automatically provide the system operator with visual and/or audio indication based feedback on the speed of objects transported through the 3D imaging volume.

In such an illustrative embodiment, disclosed in U.S. Pat. No. 7,607,581, supra, the IR Pulse-Doppler LIDAR based object motion/velocity detection subsystem 49' comprises: an IR Pulse-Doppler LIDAR transceiver 80 for transmitting IR LIDAR signals towards an object in the field of the view of the station, and receiving IR signals that scatter at the surface of the object; and an embedded DSP processor (i.e. ASIC) for processing received IR Pulse-Doppler signals (on the time and/or frequency domain), so as to abstract motion and velocity data relating to the target object. IR Pulse-Doppler LIDAR transceiver provides generated motion and velocity data to the local control subsystem 50, for processing to produce control data that is used to control aspects of operation the illumination subsystem 44, and/or the linear image formation and detection subsystem 40. By utilizing interferometry techniques normally applied in high-performance professional applications, the IR Pulse-Doppler LIDAR Motion/Velocity Sensor SIP leverages the latest developments in solid-state lasers, digital signal processing and system in a package (SIP) technology to achieve unparalleled resolution and accuracy for position/velocity sensing in consumer-product applications. Preferably, the IR Laser-Based Motion/Velocity Sensor SIP is capable of (i) detecting the movement of any surface that scatters infrared (IR) radiation, (ii) resolving these movements down to a level of less than 1 μm, and (iii) tracking object velocities of several meters per second and accelerations up to 10 g.

FIG. 4D describes an exemplary embodiment of a computing and memory architecture platform that can be used to implement the omni-directional image capturing and processing based bar code symbol reading system described in FIG. 4B. As shown, this hardware computing and memory platform can be realized on a single PC board, along with the electro-optics associated with the coplanar illumination and imaging stations and other subsystems. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the other subsystems employed in the system.

Referring to FIG. 4E, a preferred method of POS scanning optimization method, supported by the system of the second illustrative embodiment 10B, will now be described in detail.

As indicated at Block A in FIG. 4E, the first step of the method involves, prior to system operation, acquiring identification data on the system operator (e.g. cashier or sales clerk) and then storing this identification information data in the system memory of the system. Such identification information may include one or more of the following items: the system operator's name; employee identification number; etc.

As indicated at Block B in FIG. 4E, the second step of the method involves automatically acquiring the speed/velocity of each object being manually moved through the 3D imaging volume of the system, and storing the acquired speed/velocity data in system memory.

As indicated at Block C, the third step of the method involves using the object speed or velocity data (e.g. averaged, weighed or discrete samples) to adjust camera parameters (e.g. image sensing array speed, illumination duration and/or intensity, etc) within the system.

As indicated at Block D, the fourth step of the method involves capturing and processing digital images of each object moved through the 3D imaging volume of the system, in order to read one or more code symbols graphically represented in the captured digital images.

As indicated at Block E, the fifth step of the method involves using the PTS information display subsystem 300 to visually and/or acoustically display, during system operation, the detected object scan speed associated with the identified system operator, for the purpose of providing the system operator with a useful measure of pass-through-speed (PTS) feedback during product scanning and checkout operations conducted at the POS station.

In all respects, the PTS information display subsystem 300 operates in system 10B as described in connection with system 10A.

The Third Illustrative Embodiment of Bar Code Symbol Reading System Employing Globally-Deployed Imaging-Based Object Motion/Velocity Detectors in the 3D Imaging Volume Thereof As shown in FIG. 5A, a plurality of imaging-based object motion and velocity "field of views" 120A, 120B and 120C are generated from a plurality of imaging-based motion/velocity detection subsystems 121 installed in the system 10C, and operated during its Object Motion/Velocity Detection Mode. As these imaging-based object motion and velocity "field of views" are not necessarily spatially co-extensive or overlapping the coplanar illumination and imaging planes generated within the 3D imaging volume by subsystem (i.e. station) 15" in the system, the FOVs of these object motion/velocity detecting subsystems will need to use either ambient illumination or pulsed or continuously operated LED or VLD illumination sources so as to illuminate their FOVs during the Object Motion/Velocity Detection Mode of the system. Ideally, these illumination sources would produce IR illumination (e.g. in the 850 nm range). The function of these globally deployed object motion/velocity detection subsystems is to enable automatic control of illumination and/or exposure during the bar code reading mode of the system.

In FIG. 5B, the system architecture of the omni-directional image capturing and processing based bar code symbol reading system 10C of FIG. 5A is shown comprising: a complex of coplanar illuminating and linear-imaging stations 15A" through 15F" constructed using the linear illumination arrays and image sensing arrays as described hereinabove; at least one co-extensive illuminating and imaging station 15G" constructed using an area-type LED illumination array and an area-type image sensing array, spatially over-lapping each other so that the FOV of the area-type array is flooded with LED illumination during illumination and imaging operations; an multi-processor image processing subsystem 20 for supporting automatic image processing based bar code symbol reading and optical character recognition (OCR) along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15" transmits frames of image data to the image processing subsystem 25, for state-dependent image processing and the results of the image processing operations are transmitted to the host system via the input/output subsystem 25. The bar code symbol reading module 20 employed along each channel of the multi-channel image processing subsystem 20 can be realized using SwiftDecoder® Image Processing Based Bar Code Reading Software from Omniplanar Corporation, West Deptford, N.J., or any other suitable image processing based bar code reading software. Also, the system provides full support for (i) dynamically and adaptively controlling system control parameters in the digital image capture and processing system, as disclosed and taught in U.S. Pat. No. 7,607,581, as well as (ii) permitting modification and/or extension of system features and function, as disclosed and taught in U.S. Pat. No. 7,708,205, supra.

As shown in FIG. 5C, each coplanar illumination and imaging station 15" employed in the system of FIG. 5 comprises: an illumination subsystem 44 including a linear array of VLDs or LEDs 44A and 44B and associated focusing and cylindrical beam shaping optics (i.e. planar illumination arrays PLIAs), for generating a planar illumination beam (PLIB) from the station; a linear image formation and detection (IFD) subsystem 40 having a camera controller interface (e.g. FPGA) 40A for interfacing with the local control subsystem 50 and a high-resolution linear image sensing array 41 with optics providing a field of view (FOV) on the image sensing array that is coplanar with the PLIB produced by the linear illumination array 44A so as to form and detect linear digital images of objects within the FOV of the system; a local control subsystem 50 for locally controlling the operation of subcomponents within the station, in response to control signals generated by global control subsystem 37 maintained at the system level, shown in FIG. 5; an image capturing and buffering subsystem 48 for capturing linear digital images with the linear image sensing array 41 and buffering these linear images in buffer memory so as to form 2D digital images for transfer to image-processing subsystem 20 maintained at the system level, and subsequent image processing according to bar code symbol decoding algorithms, OCR algorithms, and/or object recognition processes; a high-speed image capturing and processing based motion/velocity sensing subsystem 130 (similar to subsystem 49) for measuring the motion and velocity of objects in the 3D imaging volume and supplying the motion and velocity data to the local control subsystem 50 for processing and automatic generation of control data that is used to control the illumination and exposure parameters of the linear image formation and detection system within the station. Details regarding the design and construction of planar illumination and imaging module (PLIIMs) can be found in Applicants' U.S. Pat. No. 7,028,899 B2 incorporated herein by reference.

As shown in FIG. 4C, the high-speed image capturing and processing based motion/velocity sensing subsystem 130 can be realized by an arrangement of components, comprising: an area-type image acquisition subsystem with an area-type image sensing array and optics for generating a field of view (FOV) that is preferably spatially coextensive with the longer dimensions of the FOV of the linear image formation and detection subsystem 40; an (IR) illumination area-type illumination subsystem having a pair of IR illumination arrays;

and an embedded digital signal processing (DSP) image processor for automatically processing 2D images captured by the digital image acquisition subsystem. The DSP image processor processes captured images so as to automatically abstract, in real-time, motion and velocity data from the processed images and provide this motion and velocity data to the global control subsystem 37, or alternatively to local control subsystem 40 of each station 15", for the processing and automatic generation of control data that is used to control the illumination and/or exposure parameters of the linear image formation and detection system within the station. In the illustrative embodiment, each image capturing and processing based motion/velocity sensing subsystem 130 continuously and automatically computes the motion and velocity of objects passing through the planar FOV of the station, and uses this data to generate control signals that set the frequency of the clock signal used to read out data from the linear image sensing array 41 employed in the linear image formation and detection subsystem of the system.

The area-type LED or VLD based illumination array and the area-type image sensing array 131 cooperate to produce digital images of IR-illuminated objects passing through at least a portion of the FOV of the linear image formation and detection subsystem 40. Then, DSP-based image processor (e.g. ASICs) process captured images using cross-correlation functions to compute (i.e. measure) motion and velocity regarding object(s) within the FOV of the linear image formation and detection subsystem. This motion and velocity data is then provided to the global subsystem controller 37 so that it can generate (i.e. compute) control data for controlling the frequency of the clock signal used in reading data out of the linear image sensing arrays of the image formation and detection subsystems 40 in the stations of the system. Alternatively, this motion and velocity data can be sent to the local control subsystems for local computation of control data for controlling the illumination and/or exposure parameters employed in the station. An algorithm for computing such control data, based on sensed 2D images of objects moving through (at least a portion of) the FOV of the linear image formation and detection subsystem, is employed.

Referring to FIG. 5E, a preferred method of operating the system of the third illustrative embodiment 12C will now be described in detail.

As indicated at Block A in FIG. 5E, the first step of the method involves, prior to system operation, acquiring identification data on the system operator (e.g. cashier or sales clerk) and then storing this identification information data in the system memory of the system 10C. Such identification information may include one or more of the following items: the system operator's name; employee identification number; etc.

As indicated at Block B in FIG. 5E, the second step of the method involves automatically acquiring the speed/velocity of each object being manually moved through the 3D imaging volume of the system, and storing the acquired speed/velocity data in system memory.

As indicated at Block C, the third step of the method involves using the object speed or velocity data (e.g. averaged, weighed or discrete samples) to adjust camera parameters (e.g. image sensing array speed, illumination duration and/or intensity, etc) within the system.

As indicated at Block D, the fourth step of the method involves capturing and processing digital images of each object moved through the 3D imaging volume of the system, in order to read one or more code symbols graphically represented in the captured digital images.

As indicated at Block E, the fifth step of the method involves using the PTS information display subsystem 300 to visually and/or acoustically display, during system operation, the detected object scan speed associated with the identified system operator, for the purpose of providing the system operator with a useful measure of pass-through-speed (PTS) feedback during product scanning and checkout operations conducted at the POS station.

In all respects, the PTS information display subsystem 300 operates in system 10C as described in connection with system 10A.

The Fourth Illustrative Embodiment of Bar Code Symbol Reading System Employing IR-Based Based Object Motion/Velocity Detectors About the 3D Scanning Volume Thereof In FIG. 6A, a fourth alternative embodiment of the bioptic laser scanning bar code symbol reading system 10D is shown removed from its POS environment. In this illustrative embodiment, a pair of IR object detection fields are projected outside of the limits of the horizontal and vertical scanning windows of the system, and spatially co-incident therewith, for sensing in real-time the motion and velocity of objects being passing therethrough during system operation.

As shown in greater detail, the IR-based object motion/velocity sensing fields can be generated in various ways, including from a plurality of IR Pulse-Doppler LIDAR motion/velocity detection subsystems 140 installed within the system housing. Such subsystems can be realized using a plurality of IR (Coherent or Incoherent) Pulse-Doppler LIDAR motion/velocity sensing chips mounted along the illumination array provided at each coplanar illumination and imaging station 15 in the system. In the illustrative embodiments of FIG. 6A, three such IR Pulse-Doppler LIDAR motion/velocity sensing chips (e.g. Philips PLN2020 Twin-Eye 850 nm IR Laser-Based Motion/Velocity Sensor System in a Package (SIP)) are employed in each station in the system. Details regarding this subsystem are described in US Publication No. 20080283611 A1, and corresponding portions of the present Patent Specification thereof.

As shown in FIG. 6B, the bar code symbol reading system 10D comprises: a pair of laser scanning stations (i.e. subsystems) 150A and 150B, for generating and projecting a complex of laser scanning planes into the 3D scanning volume of the system; a scan data processing subsystem 20' for supporting automatic processing of scan data collected from each laser scanning plane in the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Bluetooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems.

In FIG. 6A, the bar code symbol reading module employed along each channel of the scan data processing subsystem 20 can be realized using conventional bar code reading software well known in the art. Also, the system provides full support for (i) dynamically and adaptively controlling system control parameters in the digital image capture and processing system, as disclosed and taught in Applicants' U.S. Pat. No. 7,607,581, as well as (ii) permitting modification and/or extension of system features and function, as disclosed and taught in U.S. Pat. No. 7,708,205, supra.

Referring to FIG. 6E, a preferred method of operating the system of the fourth illustrative embodiment will now be described in detail.

As indicated at Block A in FIG. 6E, the first step of the method involves, prior to system operation, acquiring identification data on the system operator (e.g. cashier or sales clerk) and then storing this identification information data in the system memory of the system. Such identification information may include one or more of the following items: the system operator's name; employee identification number; etc.

As indicated at Block B in FIG. 6E, the second step of the method involves automatically acquiring the speed/velocity of each object being manually moved through the 3D scanning volume of the system, and storing the acquired speed/velocity data in system memory.

As indicated at Block C, the third step of the method involves capturing and processing laser scan data signals from each object moved through the 3D scanning volume of the system, in order to read one or more code symbols represented in the captured scan data signals.

As indicated at Block E, the fourth step of the method involves using the PTS information display subsystem 300 to visually and/or acoustically display, during system operation, the detected object scan speed associated with the identified system operator, for the purpose of providing the system operator with a useful measure of pass-through-speed (PTS) feedback during product scanning and checkout operations conducted at the POS station.

In all respects, the PTS information display subsystem 300 operates in system 10D as described in connection with system 10A.

Modifications that Come to Mind

While image-based, LIDAR-based, and SONAR-based motion and velocity detection techniques have been disclosed for use in implementing the object motion/velocity detection subsystem of each station of the system, it is understood that alternative methods of measurement can be used to implement such functions within the system.

Several modifications to the illustrative embodiments have been described above. It is understood, however, that various other modifications to the illustrative embodiment will readily occur to persons with ordinary skill in the art. All such modifications and variations are deemed to be within the scope of the accompanying Claims.

What is claimed is:

1. A bar code symbol reading system for installation at a POS station, comprising:
a system housing;
a bar code symbol reading subsystem, disposed in said system housing, for reading bar code symbols objects being transported through a 3D volume definable relative to said system housing, and producing symbol character data representative of said read bar code symbols;
at least one object motion sensor, disposed in said system housing, for automatically measuring or estimating the pass-through speed of objects being manually passed through said 3D imaging volume by system operator, and generating pass-through speed data representative of said measured or estimated pass-through speed of said objects; and
a pass-through speed display subsystem, disposed in said system housing, using said pass-through speed data to visually and/or audible display, in real-time, indications representative of said pass-through speed measured or estimated by said at least one object motion sensor, so as to provide the system operator with feedback for the purpose of optimizing object throughput and improving checkout times and increasing worker productivity.

2. The bar code symbol reading system of claim 1, wherein said at least one object motion sensor is selected from the group consisting of imaging based, IR-based, Pulse-Doppler LIDAR-based, and ultra-sonic energy based object motion sensors.

3. The bar code symbol reading system of claim 1, wherein said bar code symbol reading subsystem comprises a digital image detector for detecting digital images of objects being transported through said 3D volume, and an image processor for processing said digital images to read one or more code symbols on said objects and producing symbol character data representative of said read bar code symbols.

4. The bar code symbol reading system of claim 3, wherein said digital image detector comprises a linear image detector for detecting digital linear (1D) images of objects passed through said 3D volume, and said image processor is adapted for processing said digital linear images so as to decode bar code symbols graphically represented in said digital linear images and producing symbol character data representative of bar code symbols read.

5. The bar code symbol reading system of claim 3, wherein said digital image detector comprises an area-type image detector for detecting digital area (2D) images of objects passed through said 3D volume, and said image processor is adapted for processing said digital area images so as to decode bar code symbols graphically represented in said digital area images and producing symbol character data representative of bar code symbols read.

6. The bar code symbol reading system of claim 1, wherein said pass-through speed display subsystem comprises one or more of an array of light emitting diodes (LEDs) and an electronic display panel, for visually displaying said indications of said pass-through speed.

7. The bar code symbol reading system of claim 1, wherein said pass-through speed display subsystem comprises an audible sound generator for audibly displaying said indications of said pass-through speed.

8. The bar code symbol reading system of claim 1, wherein said pass-through speed display subsystem comprises: one or more of an array of light emitting diodes (LEDs) and an electronic display panel, for visually displaying said indications of said pass-through speed; and an audible sound generator for audibly displaying said indications of said pass-through speed.

9. The bar code symbol reading system of claim 1, wherein said indications include a normalized value of maximum possible pass-through speed that might be achieved at said POS station.

10. The bar code symbol reading system of claim 1, wherein said indications include an average of the pass-through speed values that have been measured for said system operator, over a given period of time.

11. The bar code symbol reading system of claim 1, wherein said indications include a bar or line graph type visually displayed at said POS station.

12. The bar code symbol reading system of claim 1, which further comprises a database for storing said pass-through-speed data for each said system operator, and making said stored pass-through-speed data for each said system operator accessible by one or more authorized managers for review and analysis, using local or remote client machines connected to said database over a communication network.

13. A method for optimizing the performance of a system operator operating, a bar code symbol reading system baying a 3D scanning volume and being installed at POS station, said method comprising the steps of:
   (a) acquiring identification information on the system operator:
   (b) passing objects through said scanning volume and automatically reading a bar code symbol on each said object and producing symbol character data representative of each bar code symbol read;
   (c) during step (b), using at least one object motion sensor to automatically measure the pass-through speed of each object being manually passed through said 3D scanning volume, and generating pass-through speed data and
   (d) using said pass-through speed data to visually and/or audibly display, in real-time, indications representative of said measured pass-through speed, thereby providing feedback to the system operator in effort to help the system operator optimize checkout speed and system throughput at said POS station.

14. The method of claim 13, where step (d) further comprises storing said pass-through-speed data for said system operator within a database, and making said stored pass-through-speed data for said system operator accessible by an authorized manager for review and analysis, using local or remote client machines connected to said database over a communication network.

15. The method of claim 13, wherein said bar code symbol reading system is a digital imaging based bar code symbol reading system, and said 3D volume is a 3D imaging volume.

16. The method of claim 13, wherein said bar code symbol reading system is a laser scanning based bar code symbol reading system, and said 3D volume is a 3D scanning volume.

17. The method Of claim 13, wherein said pass-through speed display subsystem comprises one or more of an array of light emitting diodes (LEDs) and an electronic display panel, for visually displaying said indications of said pass-through speed wiring step (c).

18. The method of claim 13, wherein said pass-through speed display subsystem further comprises an audible sound generator for audibly displaying said indications of said pass-through speed during step (c).

19. The method of claim 13, wherein said pass-through speed display subsystem comprises: one or more of an array of light emitting diodes (LEDs) and an electronic display panel, for visually displaying said indications of said pass-through speed during step (c); and an audible sound generator for audibly displaying said indications of said pass-through speed during step (c).

20. The method of claim 13, wherein said indications displayed during step (c) include a normalized value of maximum possible pass-through speed that might be achieved at said POS station.

21. The method of claim 13, wherein said indications displayed during step (c) include an average of the pass-through speed values that have been measured for said system operator, over a given period of time.

* * * * *